(12) United States Patent
Sakata et al.

(10) Patent No.: US 12,169,657 B2
(45) Date of Patent: Dec. 17, 2024

(54) DISPLAY CONTROL DEVICE THAT ACQUIRES DISPLAY DEVICE INFORMATION FOR DISPLAYS THAT DISPLAY A PRESET IMAGE AND DISPLAY CONTROL METHOD

(71) Applicant: Mitsubishi Electric Corporation, Tokyo (JP)

(72) Inventors: Reiko Sakata, Tokyo (JP); Naoki Furuhata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 227 days.

(21) Appl. No.: 17/834,932

(22) Filed: Jun. 8, 2022

(65) Prior Publication Data
US 2022/0300233 A1   Sep. 22, 2022

Related U.S. Application Data

(63) Continuation of application No. PCT/JP2020/002870, filed on Jan. 28, 2020.

(51) Int. Cl.
  G06F 3/14      (2006.01)
(52) U.S. Cl.
  CPC ..................................... *G06F 3/14* (2013.01)
(58) Field of Classification Search
  None
  See application file for complete search history.

(56) References Cited

U.S. PATENT DOCUMENTS

| 10,168,976 | B2 * | 1/2019 | Rozner | G06F 3/1423 |
| 2002/0075288 | A1 | 6/2002 | Matsumura et al. | |
| 2009/0066712 | A1 * | 3/2009 | Gilger | G06F 3/04817 |
| | | | | 345/581 |

(Continued)

FOREIGN PATENT DOCUMENTS

| JP | 2002-196718 A | 7/2002 |
| JP | 5174563 B2 | 4/2013 |

(Continued)

OTHER PUBLICATIONS

International Search Report and Written Opinion mailed on Apr. 7, 2020, received for PCT Application PCT/JP2020/002870, Filed on Jan. 28, 2020, 11 pages including English Translation.

*Primary Examiner* — Anh-Tuan V Nguyen
(74) *Attorney, Agent, or Firm* — XSENSUS LLP

(57) ABSTRACT

A display control device includes: a display device information acquiring unit to acquire display device information indicating each of a plurality of display devices that displays a preset image; a preset image acquiring unit to acquire preset image information indicating a preset image displayed by each of the display devices; an operation state acquiring unit to acquire operation state information indicating an operation state of each of the display devices; a display image generating unit to generate a display image, wherein the display image generating unit generates, for each of the display devices, the display device image in which display device information, a preset image indicated by preset image information, and the operation state information are associated with each other, and generates a display image in which a plurality of generated display device images are aligned.

19 Claims, 13 Drawing Sheets

(56) References Cited

U.S. PATENT DOCUMENTS

| | | | | |
|---|---|---|---|---|
| 2010/0131623 A1* | 5/2010 | Lonkar | ............... | G06F 3/1438 709/221 |
| 2011/0175701 A1* | 7/2011 | Kobayashi | ............ | G06F 3/1454 340/3.7 |
| 2013/0050274 A1* | 2/2013 | Yamada | ............. | H04N 21/4751 345/671 |
| 2014/0365980 A1* | 12/2014 | Morrison | ................ | G06T 17/05 715/863 |
| 2015/0270969 A1* | 9/2015 | Ishizaka | ................... | H04L 9/30 713/185 |
| 2017/0201777 A1* | 7/2017 | Agarwal | ............ | G06Q 30/0643 |
| 2017/0270970 A1* | 9/2017 | Ho | ........................ | G06F 16/583 |
| 2021/0082064 A1* | 3/2021 | Briffa | .................... | G06Q 10/02 |
| 2022/0232193 A1* | 7/2022 | Vancraybex | ........... | H04N 7/183 |

FOREIGN PATENT DOCUMENTS

| | | |
|---|---|---|
| JP | 2017-204124 A | 11/2017 |
| JP | 2018-106010 A | 7/2018 |

* cited by examiner

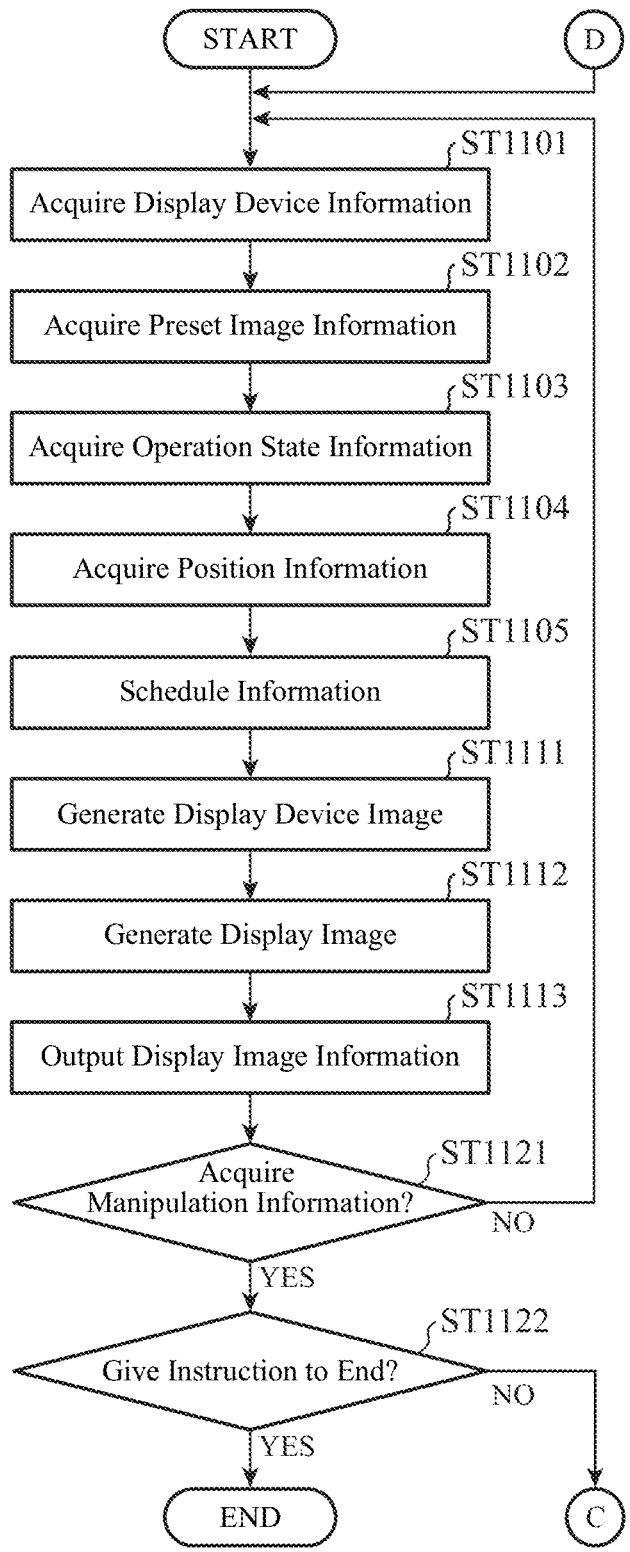

DISPLAY CONTROL DEVICE THAT ACQUIRES DISPLAY DEVICE INFORMATION FOR DISPLAYS THAT DISPLAY A PRESET IMAGE AND DISPLAY CONTROL METHOD

CROSS-REFERENCE TO RELATED APPLICATION

The present application is a continuation of International Patent Application PCT/JP2020/002870, filed Jan. 28, 2020, the entire contents of which are incorporated herein by reference.

TECHNICAL FIELD

The present disclosure relates to a display control device and a display control method.

BACKGROUND ART

A display device that performs display such as advertisement display or guidance display is disposed in a facility such as a commercial facility, an office building, a school, a station, or a parking lot.

A display device disposed in a facility displays a predetermined image (hereinafter referred to as a "preset image") in accordance with a predetermined schedule.

For example, Patent Literature 1 discloses information display technology for controlling and monitoring display of an outdoor information display board by including an outdoor information display board capable of light emission display, a communication unit capable of communicating with a mobile terminal, a display control unit that generates a display control signal for causing the outdoor information display board to execute predetermined light emission display in accordance with a display command signal received from the mobile terminal, and a display monitoring unit that generates a monitoring information signal for transmitting monitoring information indicating an execution state of the light emission display to the mobile terminal.

CITATION LIST

Patent Literatures

Patent Literature 1: Japanese Patent Laid-Open Publication No. 2018-106010

SUMMARY OF INVENTION

Technical Problem

In the conventional technology disclosed in Patent Literature 1, in a case where a plurality of display devices that are outdoor information display boards are arranged, display contents of a certain display device could not have been simultaneously compared with display contents of other display devices.

An object of the present disclosure is to provide a display control device enabling that each of display contents displayed on a plurality of display devices to be compared simultaneously in a case where the plurality of display devices are arranged.

Solution to Problem

A display control device according to the present disclosure includes: processing circuitry to perform a process to: acquire display device information indicating each of a plurality of display devices which displays a preset image using devices being disposed in a facility; acquire preset image information indicating the preset image displayed by each of the plurality of the display devices; acquire operation state information indicating an operation state of each of the plurality of the display devices; acquire position information indicating a position where each of the plurality of the display devices is arranged; generate a display image, wherein the process generates, for each of the display devices, the display device image in which the display device information acquired, the preset image indicated by the preset image information acquired, the operation state information acquired and the position information acquired are associated with each other, and generates the display image in which a plurality of the display device images generated are aligned; and output to a monitor the display image generated as display image information.

Advantageous Effects of Invention

According to the present disclosure, in a case where the plurality of display devices are arranged, display contents displayed on each of the plurality of display devices can be simultaneously compared.

BRIEF DESCRIPTION OF DRAWINGS

FIG. 11A is a part of a flowchart illustrating an example of processing of the display control device according to the second embodiment.

DESCRIPTION OF EMBODIMENTS

Hereinafter, embodiments of the present disclosure will be described in detail with reference to the drawings.

First Embodiment

A display control device 100 according to a first embodiment will be described with reference to FIGS. 1 to 6 and FIGS. 7A and 7B.

The configuration of a main part of a display system 1 to which the display control device 100 according to the first embodiment is applied will be described with reference to FIG. 1.

Figure 1:
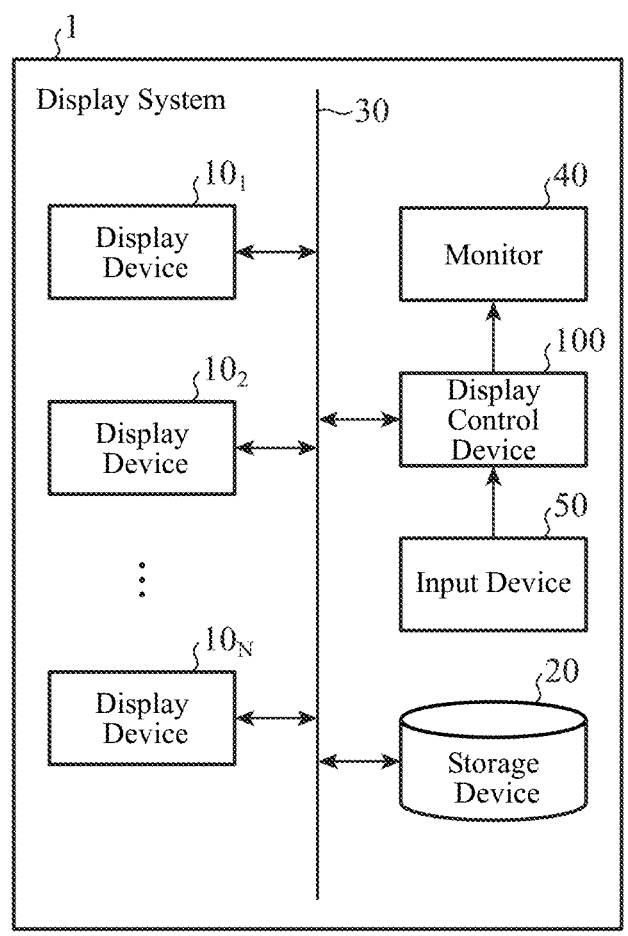
FIG. 1 is a block diagram illustrating an example of configuration of a main part of a display system to which a display control device according to a first embodiment is applied.

FIG. 1 is a block diagram illustrating an example of the configuration of the main part of the display system 1 to which the display control device 100 according to the first embodiment is applied.

The display system 1 includes N (N is a natural number equal to or greater than two) display devices $10_1$, $10_2$, ..., $10_N$, a storage device 20, a network 30, a display control device 100, a monitor 40, and an input device 50. The display system 1 may include a sensor (not illustrated) in addition to the above-described configuration. Furthermore, the display system 1 may include an imaging device (not illustrated) in addition to the above-described configuration.

The network 30 is a communication line such as a local area network (LAN) or a wireless LAN. The display devices $10_1$, $10_2$, ..., $10_N$, the storage device 20, the display control device 100, a sensor (not illustrated), and an imaging device (not illustrated) included in the display system 1 are each connected via the network 30 capable of transmitting and receiving information.

The storage device 20 includes, for example, a storage medium such as a solid state drive (SSD) or a hard disk drive (HDD). The storage device 20 writes information in the storage medium in accordance with a writing request received from the outside of the device via the network 30 and reads out information stored in the storage medium in accordance with a readout request received from the outside of the device via the network 30.

Each of the plurality of display devices $10_1$, $10_2$, ..., $10_N$ is arranged in a facility and displays a predetermined image (hereinafter referred to as a "preset image") in a space in the facility in accordance with a predetermined schedule. Moreover, each of the plurality of display devices $10_1$, $10_2$, ..., $10_N$ may display a preset image corresponding to detection on a pedestrian or on opening and closing of a door in a sensor (not illustrated) in a space in the facility in accordance with the detection.

The preset image herein includes a predetermined still image and a predetermined moving image. The display devices $10_1$, $10_2$, ..., $10_N$ may display a still image or a moving image, which is a preset image, and output audio corresponding to the still image or the moving image via a speaker or the like in accordance with the schedule.

Note that the space in the facility herein includes a region on a structure constituting the facility, a space including a structure constituting the facility, or the like. Moreover, the structure constituting the facility is a floor in the facility, a wall in the facility, a door in the facility, a landing door of an elevator disposed in the facility, or the like.

Furthermore, the plurality of display devices $10_1$, $10_2$, ..., $10_N$ are not necessarily all arranged in the same facility, and some of the plurality of display devices $10_1$, $10_2$, ..., and $10_N$ may be arranged in a certain facility, and the rest may be arranged in one or more other facilities.

In addition, the plurality of display devices $10_1$, $10_2$, ..., $10_N$ are not limited to those fixed to a structure constituting a facility. For example, the plurality of display devices $10_1$, $10_2$, ..., $10_N$ may be relocatable in the facility, or may be movable in the facility by self-propelling of the display devices $10_1$, $10_2$, ..., $10_N$.

The display devices $10_1$, $10_2$, ..., $10_N$ include a display unit such as a projection type display such as a front projector, a display type display such as a light emitting diode (LED) display or an organic electro-luminescence (EL) display, or a display that forms an image in the air such as an aerial display.

Specifically, for example, the display devices $10_1$, $10_2$, ..., $10_N$ acquire preset image information indicating a preset image and schedule information indicating a schedule. The display devices $10_1$, $10_2$, ..., $10_N$ cause the display units of the display devices $10_1$, $10_2$, ..., $10_N$ to display the preset image indicated by the acquired preset image information in accordance with the schedule indicated by the acquired schedule information.

More specifically, for example, the display devices $10_1$, $10_2$, ..., $10_N$ include a storage unit constituted by a storage medium such as a semiconductor memory or a magnetic disk. The display devices $10_1$, $10_2$, ..., $10_N$ acquire the preset image information and the schedule information by reading out the preset image information and the schedule information stored in advance in the storage unit from the storage unit. The display devices $10_1$, $10_2$, ..., $10_N$ may acquire the preset image information and the schedule information by reading out the preset image information and the schedule information stored in advance in the storage device 20 from the storage device 20 via the network 30.

Furthermore, for example, the display devices $10_1$, $10_2$, ..., $10_N$ may receive a preset image signal indicating a preset image output from an external device (not illustrated), and display the preset image indicated by the preset image signal on the basis of the preset image signal. The external device outputs the preset image signal to each of the display devices $10_1$, $10_2$, ..., and $10_N$ in accordance with the schedule corresponding to each of the display devices $10_1$, $10_2$, ..., $10_N$.

In the first embodiment, each of the display devices $10_1$, $10_2$, ..., $10_N$ includes a storage unit, and in the first embodiment, each of the display devices $10_1$, $10_2$, ..., $10_N$ will be described as reading out the preset image information and the schedule information from the storage unit included in each of the display devices $10_1$, $10_2$, ..., $10_N$ to display the preset image on the display unit included in each of the display devices $10_1$, $10_2$, ..., $10_N$ in accordance with the schedule.

The display control device 100 generates a display image and outputs display image information indicating the generated display image to the monitor 40. The details of the display control device 100 will be described later.

The monitor 40 is a display such as an LED display or an organic EL display. The monitor 40 receives the display image information output from the display control device 100 and displays the display image indicated by the display image information.

The input device 50 is a manipulation input device such as a keyboard or a mouse that receives an input manipulation from a user, and outputs manipulation information indicating the user manipulation to the display control device 100 in response to the user manipulation that is input manipulation from the user.

The configuration of a main part of the display control device 100 according to the first embodiment will be described with reference to FIG. 2.

Figure 2:
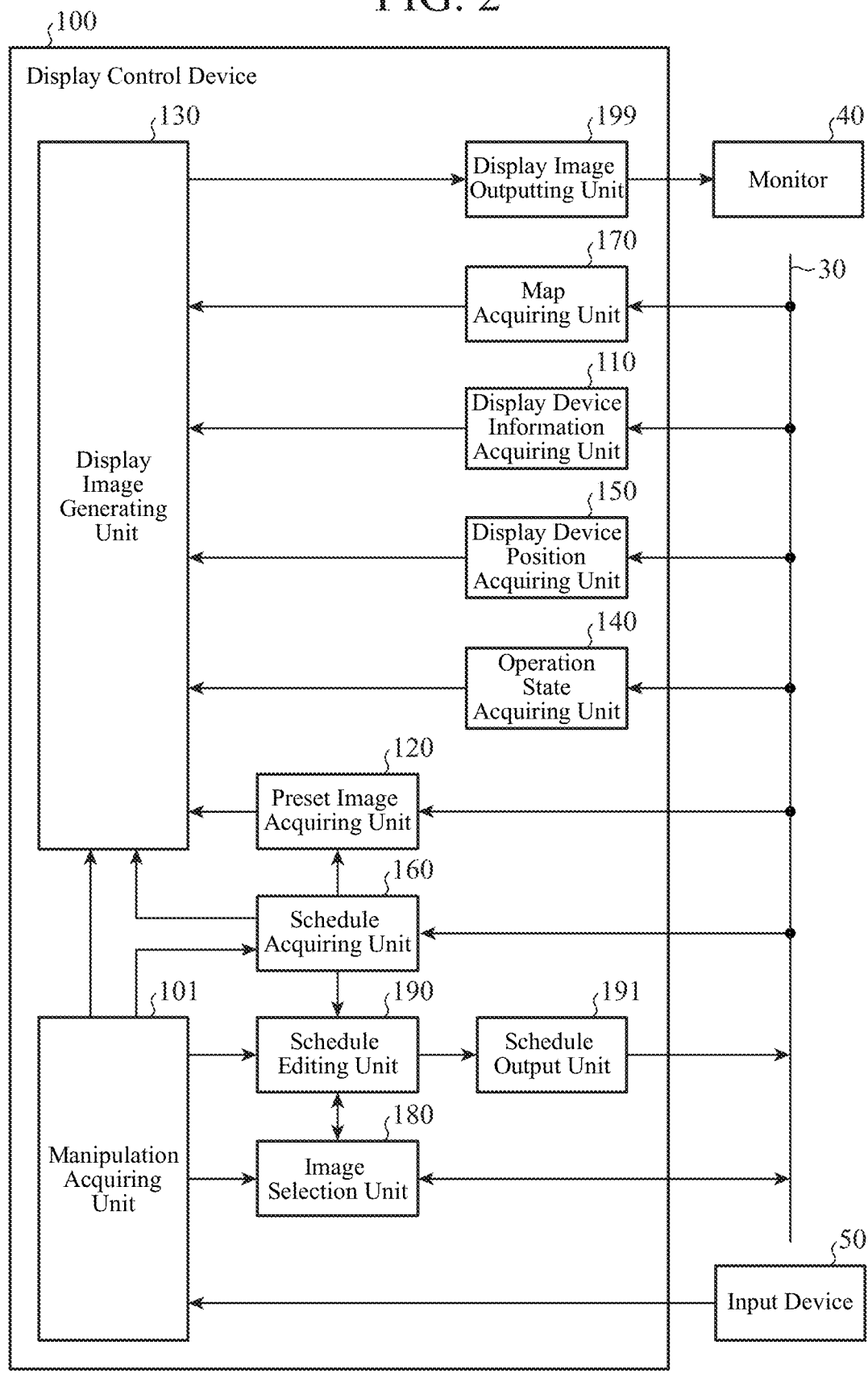
FIG. 2 is a block diagram illustrating an example of the configuration of the main part of the display control device according to the first embodiment.

FIG. 2 is a block diagram illustrating an example of the configuration of the main part of the display control device 100 according to the first embodiment.

The display control device 100 includes a manipulation acquiring unit 101, a display device information acquiring unit 110, a preset image acquiring unit 120, a display image generating unit 130, and a display image outputting unit 199.

In addition to the above-described configuration, the display control device 100 may include an operation state acquiring unit 140, a display device position acquiring unit 150, a schedule acquiring unit 160, a map acquiring unit 170, an image selection unit 180, a schedule editing unit 190, and a schedule output unit 191.

Furthermore, in addition to the above-described configuration, the display control device 100 may include an image acquiring unit, an image editing unit, and an image output unit, all of which are not illustrated.

In the first embodiment, the display control device 100 will be described as including the manipulation acquiring unit 101, the display device information acquiring unit 110, the preset image acquiring unit 120, the display image generating unit 130, the operation state acquiring unit 140, the display device position acquiring unit 150, the schedule acquiring unit 160, the map acquiring unit 170, the image selection unit 180, the schedule editing unit 190, the schedule output unit 191, and the display image outputting unit 199.

The manipulation acquiring unit 101 acquires manipulation information indicating the user manipulation. Specifically, for example, the manipulation acquiring unit 101 acquires the manipulation information by receiving the manipulation information output from the input device 50.

The display device information acquiring unit 110 acquires display device information indicating each of the plurality of display devices $10_1, 10_2, \ldots, 10_N$ disposed in the facility and displaying the preset image. Specifically, for example, the display device information is information indicating the name of each of the display devices $10_1, 10_2, \ldots, 10_N$.

The display device information is not limited to the information indicating the name as long as the display device information can be specified. Specifically, the display device information may be information indicating an internet protocol (IP) address, information indicating a feature, information indicating a type, information indicating a region disposed in the facility, or the like of each of the display devices $10_1, 10_2, \ldots, 10_N$.

For example, the display device information acquiring unit 110 searches for the display devices $10_1, 10_2, \ldots, 10_N$ connected to the network 30 via the network 30 and acquires the display device information on the display devices $10_1, 10_2, \ldots, 10_N$ found by the search from each of the display devices $10_1, 10_2, \ldots, 10_N$. Furthermore, for example, the display device information acquiring unit 110 may acquire the display device information by reading out the display device information from the storage device 20 in which the display device information is stored in advance.

The preset image acquiring unit 120 acquires preset image information indicating a preset image displayed by each of the plurality of display devices $10_1, 10_2, \ldots, 10_N$.

In the first embodiment, as an example, the description will be given on the assumption that the preset image acquiring unit 120 acquires the preset image information from each of the display devices $10_1, 10_2, \ldots, 10_N$ connected to the network 30. An acquisition source from which the preset image acquiring unit 120 acquires the preset image information is not limited to the display devices $10_1, 10_2, \ldots, 10_N$. For example, the preset image acquiring unit 120 may acquire the preset image information by reading out the preset image information corresponding to each of the display devices $10_1, 10_2, \ldots, 10_N$ from the storage device 20 in which the preset image information is stored in advance.

The preset image acquiring unit 120 acquires the preset image information indicating the preset image displayed at a predetermined time point such as the current time point by each of the display devices $10_1, 10_2, \ldots, 10_N$ among the preset image information indicating the preset image displayed in accordance with the predetermined schedule by each of the plurality of display devices $10_1, 10_2, \ldots, 10_N$.

The display image generating unit 130 generates a display image.

Specifically, the display image generating unit 130 generates, for each of the display devices $10_1, 10_2, \ldots, 10_N$, a display device image in which the display device information acquired by the display device information acquiring unit 110 is associated with the preset image indicated by the preset image information acquired by the preset image acquiring unit 120. Furthermore, the display image generating unit 130 generates a display image in which a plurality of display device images generated by the display image generating unit 130 str disposed.

The display image outputting unit 199 outputs the display image generated by the display image generating unit 130 as display image information.

Specifically, the display image outputting unit 199 outputs the display image information to the monitor 40. The monitor 40 receives the display image information output from the display image outputting unit 199 and displays the display image indicated by the display image information.

A display image 200 indicated by the display image information output by the display control device 100 according to the first embodiment will be described with reference to FIGS. 3 and 4.

Figure 3:
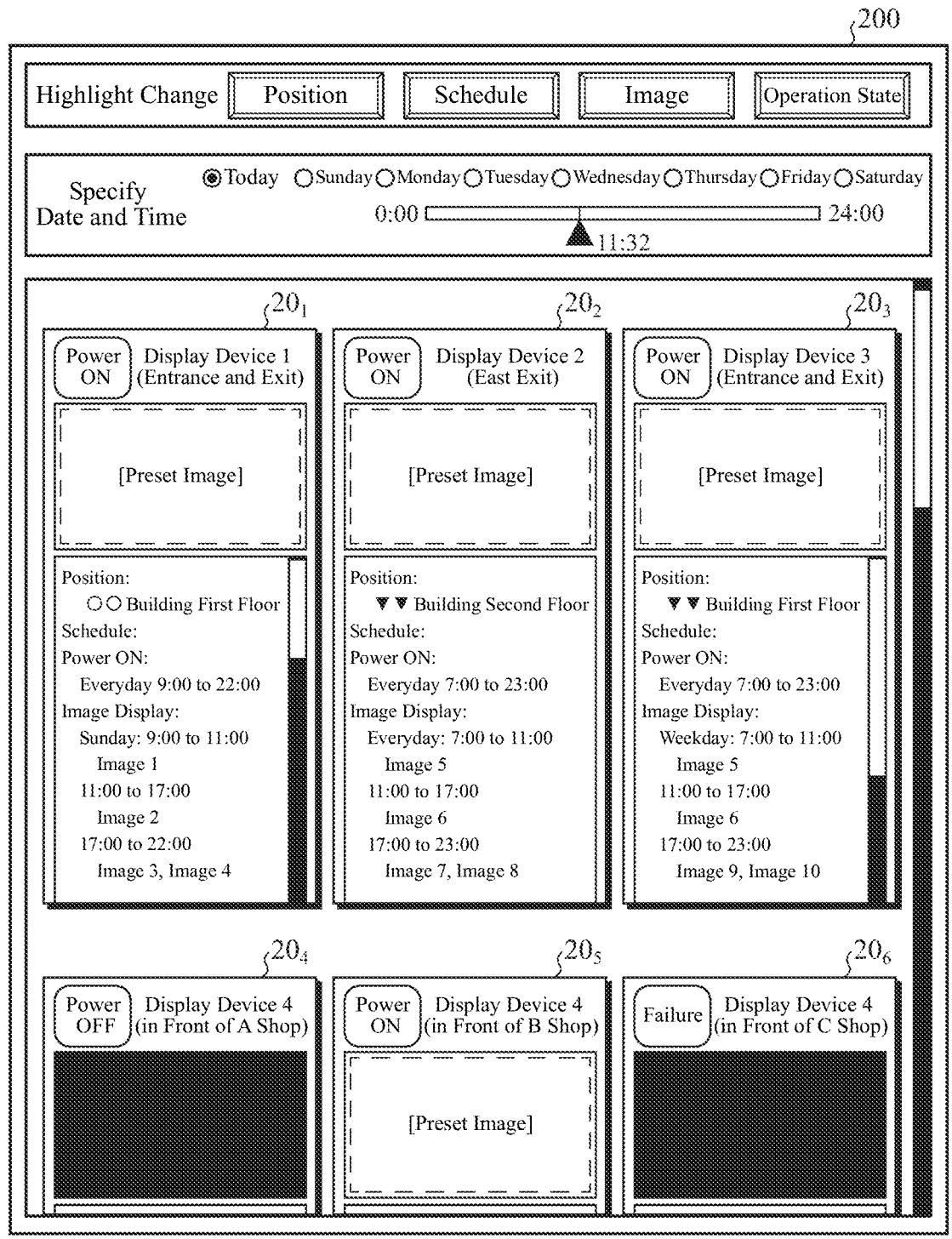
FIG. 3 is an explanatory diagram illustrating an example of a display image indicated by display image information output by the display control device according to the first embodiment.

FIG. 3 is an explanatory diagram illustrating an example of the display image 200 indicated by the display image information output by the display control device 100 according to the first embodiment.

Figure 4:
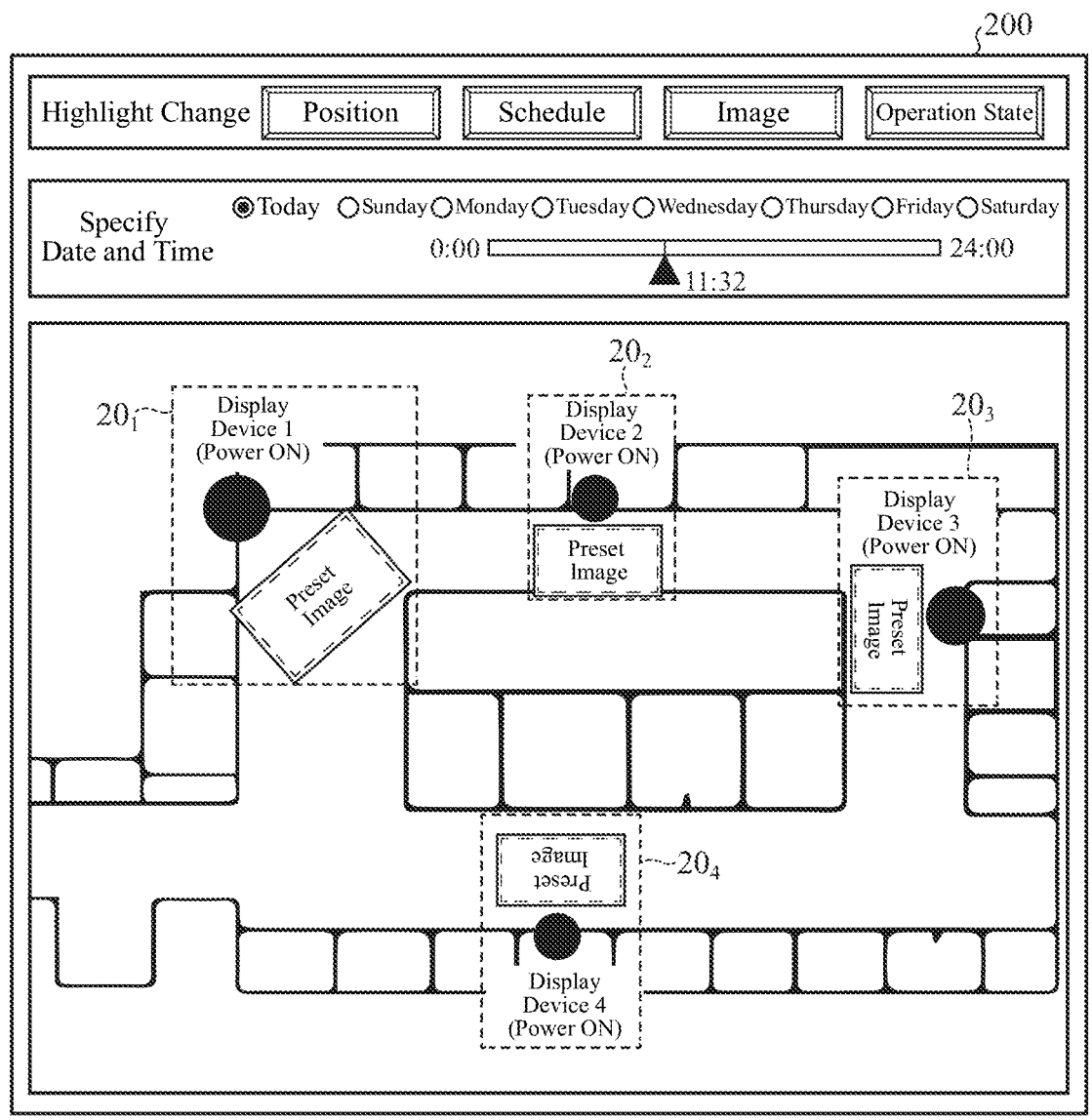
FIG. 4 is an explanatory diagram illustrating another example of a display image indicated by display image information output by the display control device according to the first embodiment.

FIG. 4 is an explanatory diagram illustrating another example of the display image 200 indicated by the display image information output by the display control device 100 according to the first embodiment.

The display images 200 illustrated in FIGS. 3 and 4 include the display device images $20_1, 20_2, \ldots, 20_N$ in which the display device information corresponding to each of the display devices $10_1, 10_2, \ldots, 10_N$ and the preset images indicated by the preset image information corresponding to each of the display devices $10_1, 10_2, \ldots, 10_N$ are associated with each other for each of the display devices $10_1, 10_2, \ldots, 10_N$.

As an example, the display image 200 illustrated in FIG. 3 is obtained by arranging the display device images $20_1, 20_2, \ldots, 20_N$ in a lattice pattern.

The display image generating unit 130 generates the display image 200 in which the plurality of display device images $20_1, 20_2, \ldots, 20_N$ generated by the display image generating unit 130 are disposed in a lattice pattern.

Note that, in a case where a part of the display image 200 generated by the display image generating unit 130 does not fit in the display region of the monitor 40, the display control device 100 may display the entire display image 200 in the display region of the monitor 40 by enabling scroll display, for example, as illustrated in FIG. 3.

Moreover, as an example, the display image 200 illustrated in FIG. 4 is obtained by arranging the display device images $20_1, 20_2, \ldots,$ and $20_N$ on a map image (hereinafter, it is simply referred to as a "map image") indicating a map of the inside of the facility in association with positions (hereinafter, they are simply referred to as "positions of display devices $10_1, 10_2, \ldots, 10_N$") at which each of the plurality of display devices $10_1, 10_2, \ldots, 10_N$ is arranged.

The map image is acquired as map information by the map acquiring unit 170. Specifically, for example, the map information indicating the map image is stored in advance in the storage device 20. The map acquiring unit 170 acquires the map information by reading out the map information stored in the storage device 20 from the storage device 20.

The positions of the display devices $10_1, 10_2, \ldots, 10_N$ are acquired as position information by the display device position acquiring unit 150. Specifically, for example, the display device position acquiring unit 150 acquires position information indicating the positions of the display devices $10_1, 10_2, \ldots, 10_N$ from each of the display devices $10_1, 10_2, \ldots, 10_N$. The display device position acquiring unit 150 may acquire the position information by reading out the position information from the storage device 20 in which the position information is stored in advance.

In addition to the information indicating the positions of the display devices $10_1, 10_2, \ldots, 10_N$, the position information may include display position information indicating the position of the display region in which each of the display devices $10_1, 10_2, \ldots, 10_N$ displays the preset image. The display position information is, for example, information indicating the position, size, orientation, height, or the like of the display region.

The display image generating unit 130 generates the display image 200 in which each of the plurality of display device images $20_1, 20_2, \ldots, 20_N$ generated by the display image generating unit 130 is arranged and aligned on the map image indicated by the map information acquired by the map acquiring unit 170 in association with the positions of the display devices $10_1, 10_2, \ldots, 10_N$ indicated by the position information acquired by the display device position acquiring unit 150.

When the display device images $20_1, 20_2, \ldots, 20_N$ are arranged and aligned on the map image, the display image generating unit 130 may generate the display image 200 by referring to the display position information included in the position information. Specifically, for example, the display image generating unit 130 generates the display image 200 in which the display device images $20_1, 20_2, \ldots, 20_N$ are arranged and aligned on the map image in association with the position, size, orientation, height, or the like of the display region indicated by the display position information.

● in the display device images $20_1, 20_2, \ldots, 20_N$ illustrated in FIG. 4 is an image of a position where the display devices $10_1, 10_2, \ldots, 10_N$ are arranged. As illustrated in FIG. 4, the display device images $20_1, 20_2, \ldots, 20_N$ generated by the display image generating unit 130 may include images indicating positions at which the display devices $10_1, 10_2, \ldots, 10_N$ indicated by the position information are arranged. In addition to the display device information and the preset image, the display image generating unit 130 generates display device images $20_1, 20_2, \ldots, 20_N$ by associating images indicating positions at which the display devices $10_1, 10_2, \ldots, 10_N$ are arranged.

The display image generating unit 130 may determine the size of ●, which is an image indicating the positions at which the display devices $10_1, 10_2, \ldots, 10_N$ indicated by the position information are arranged, on the basis of the information indicating the height at the position at which the display devices $10_1, 10_2, \ldots, 10_N$ indicated by the position information are arranged. With this configuration, a user can intuitively grasp the heights at which the display devices $10_1, 10_2, \ldots, 10_N$ are arranged in the display device images $20_1, 20_2, \ldots, 20_N$.

As an example, the map image in the display image 200 illustrated in FIG. 4 is a cross-sectional view of a floor of a facility as viewed from above, and is a plan view of a map of the floor of the facility. The map image indicated by the map information is not limited to the one illustrated in the plan view, and may be a three-dimensional view obtained by three-dimensionally modeling the inside of the facility.

With the above configuration, in a case where a plurality of display devices $10_1, 10_2, \ldots, 10_N$ are arranged, the display control device 100 can cause the monitor 40 to display the display contents displayed on each of the plurality of display devices $10_1, 10_2, \ldots, 10_N$ so that the display contents can be simultaneously compared. In particular, the display control device 100 can cause the monitor 40 to display the preset images displayed by each of the plurality of display devices $10_1, 10_2, \ldots, 10_N$ at a predetermined time point such as a current time point so that the preset images can be simultaneously compared.

As illustrated in FIG. 3 or 4, the display device images $20_1, 20_2, \ldots, 20_N$ generated by the display image generating unit 130 may include images indicating each operation states of the plurality of display devices $10_1, 10_2, \ldots, 10_N$.

Herein, the operation state of the display devices $10_1, 10_2, \ldots, 10_N$ is, for example, a state of ON or OFF of the power supply of each of the display devices $10_1, 10_2, \ldots, 10_N$, presence or absence of failures or the like.

The display control device 100 acquires, by the operation state acquiring unit 140, operation state information (hereinafter, it is simply referred to as "operation state information on a display device $10_1, 10_2, \ldots, 10_N$") indicating the operation state of each of the plurality of display devices $10_1, 10_2, \ldots, 10_N$. The operation state acquiring unit 140 acquires, for example, operation state information on the display devices $10_1, 10_2, \ldots, 10_N$ from the display devices $10_1, 10_2, \ldots, 10_N$, respectively. The operation state acquiring unit 140 may acquire the operation state information on the display devices $10_1, 10_2, \ldots, 10_N$ by reading out the operation state information from the storage device 20 in which the operation state information is stored in advance.

Note that the operation states of the display devices $10_1, 10_2, \ldots, 10_N$ are not limited to those described above. For example, the operation states of the display devices $10_1, 10_2, \ldots, 10_N$ may be whether or not the display states of the preset images on the display devices $10_1, 10_2, \ldots, 10_N$ are good, or the like. For example, there is a case where sunlight or light emitted from a lighting fixture or the like installed in a facility may enter a display region where the display devices $10_1, 10_2, \ldots, 10_N$ display a preset image, and the display state of the preset image on the display devices $10_1, 10_2, \ldots, 10_N$ may not be good. Furthermore, for example, there is a case where a pedestrian stays around a display region where the display devices $10_1, 10_2, \ldots, 10_N$ display preset images, and the pedestrian has difficulty in viewing the display of the preset images on the display devices $10_1, 10_2, \ldots, 10_N$. In such a case, there is a case where a countermeasure for changing the positions at which the display devices $10_1, 10_2, \ldots, 10_N$ are arranged, a countermeasure for changing the directions in which the display devices $10_1, 10_2, \ldots, 10_N$ are arranged, or the like should be performed.

For example, the operation state acquiring unit 140 is an imaging device (not illustrated in FIG. 1), and acquires, from the imaging device via the network 30, captured image information indicating a captured image that is an image captured by the imaging device that captures a display region where the display devices $10_1, 10_2, \ldots, 10_N$ display preset images. Note that the number of imaging devices is not limited to one, and may be a plurality of imaging devices that each captures an image of a region corresponding to a display region in which a preset image is displayed by each of the plurality of display devices $10_1, 10_2, \ldots, 10_N$.

The operation state acquiring unit 140 analyzes the captured image indicated by the captured image information acquired using the image analysis technology or the like, determines whether or not the display state of the preset image on the display devices $10_1, 10_2, \ldots, 10_N$ is good, and acquires the determination result as operation state information.

Note that a technology such as an image analysis technology for analyzing the captured image indicated by the captured image information is known, and thus a detailed description thereof will be omitted.

When generating the display device images $20_1, 20_2, \ldots, 20_N$ for each of the display devices $10_1, 10_2, \ldots,$ and $10_N$, the display image generating unit 130 generates, for each of the display devices $10_1, 10_2, \ldots,$ and $10_N$, display device images $20_1, 20_2, \ldots, 20_N$ in which the operation state information acquired by the operation state acquiring unit 140 is associated, in addition to the display device information acquired by the display device information acquiring unit 110 and the preset image indicated by the preset image information acquired by the preset image acquiring unit 120. The display image generating unit 130 generates a display image 200 in which a plurality of display device images $20_1, 20_2, \ldots, 20_N$ generated by the display image generating unit 130 are aligned.

Note that the display device images $20_1, 20_2, \ldots, 20_N$ in the display image 200 illustrated in FIG. 3 or 4 indicate a state in which the images indicating the operation states of the display devices $10_1, 10_2, \ldots, 10_N$ are always displayed. However, the images indicating the operation states of the display devices $10_1, 10_2, \ldots,$ and $10_N$ may be such that, for example, a pop-up image is displayed only when the user performs a manipulation input via the input device 50 and selects a desired display device $10_1, 10_2, \ldots, 10_N$ among the plurality of display devices $10_1, 10_2, \ldots,$ and $10_N$. The same applies to FIG. 4.

Moreover, in the display device images $20_1, 20_2, \ldots, 20_N$ illustrated in FIG. 3 or 4, the images indicating the operation states of the display devices $10_1, 10_2, \ldots, 10_N$ are text images indicating whether the power of the display devices $10_1, 10_2, \ldots, 10_N$ is turned on or off, whether there is a failure in the display devices $10_1, 10_2, \ldots,$ and $10_N$, or the like, but the images indicating the operation states of the display devices $10_1, 10_2, \ldots, 10_N$ are not limited to text images. For example, the images indicating the operation states of the display devices $10_1, 10_2, \ldots, 10_N$ may be an image with a color, a shape, a pattern combining a plurality of colors, or the like determined in advance for each operation state.

The display device images $20_1, 20_2, \ldots, 20_N$ generated by the display image generating unit 130 may include images indicating the positions of the display devices $10_1, 10_2, \ldots, 10_N$. As illustrated in FIG. 3, the images indicating the positions of the display devices $10_1, 10_2, \ldots, 10_N$ are, for example, text images. Note that the display device images $20_1, 20_2, \ldots, 20_N$ illustrated in FIG. 4 do not include text images as images indicating the positions of the display devices $10_1, 10_2, \ldots, 10_N$, but may include text images.

When generating the display device images $20_1, 20_2, \ldots, 20_N$ for each of the display devices $10_1, 10_2, \ldots, 10_N$, the display image generating unit 130 generates, for each of the display devices $10_1, 10_2, \ldots, 10_N$, display device images $20_1, 20_2, \ldots, 20_N$ in which position information acquired by the display device position acquiring unit 150 is associated, in addition to the display device information acquired by the display device information acquiring unit 110 and the preset image indicated by the preset image information acquired by the preset image acquiring unit 120. The display image generating unit 130 generates a display image 200 in which a plurality of display device images $20_1, 20_2, \ldots, 20_N$ generated by the display image generating unit 130 are aligned.

Note that the display device images $20_1, 20_2, \ldots, 20_N$ in the display image 200 illustrated in FIG. 3 indicate a state in which the images indicating the positions of the display devices $10_1, 10_2, \ldots, 10_N$ are always displayed. However, for the images indicating the positions of the display devices $10_1, 10_2, \ldots,$ and $10_N$, for example, a pop-up image may be displayed only when the user performs a manipulation input via the input device 50 and selects a desired display device $10_1, 10_2, \ldots, 10_N$ among the plurality of display devices $10_1, 10_2, \ldots, 10_N$. The same applies to FIG. 4.

The display device images $20_1, 20_2, \ldots, 20_N$ generated by the display image generating unit 130 may include images indicating schedules (hereinafter, it is simply referred to as "schedule of display devices $10_1, 10_2, \ldots, 10_N$") in which the display devices $10_1, 10_2, \ldots, 10_N$ display preset images. The image indicating the schedules of the display devices $10_1, 10_2, \ldots, 10_N$ are, for example, a text image as illustrated in FIG. 3. Note that the display device images $20_1, 20_2, \ldots, 20_N$ illustrated in FIG. 4 do not include the images indicating the schedules of the display devices $10_1, 10_2, \ldots, 10_N$, but may include the images.

The display control device 100 acquires schedule information indicating the schedules of the display devices $10_1, 10_2, \ldots, 10_N$ by the schedule acquiring unit 160. The schedule acquiring unit 160 acquires, for example, schedule information indicating the schedules of the display devices $10_1, 10_2, \ldots, 10_N$ from each of the display devices $10_1, 10_2, \ldots, 10_N$. The schedule acquiring unit 160 may acquire the schedule information indicating the schedules of the display devices $10_1, 10_2, \ldots, 10_N$ by reading out the schedule information from the storage device 20 in which the schedule information is stored in advance.

Note that the display device images $20_1, 20_2, \ldots, 20_N$ in the display image 200 illustrated in FIG. 3 indicate a state in which the images indicating the schedules of the display devices $10_1, 10_2, \ldots, 10_N$ are always displayed. However, for the images indicating the schedules of the display devices $10_1, 10_2, \ldots, 10_N$, for example, a pop-up image may be displayed only when the user performs a manipulation input via the input device 50 and selects a desired display device $10_1, 10_2, \ldots, 10_N$ among the plurality of display devices $10_1, 10_2, \ldots, 10_N$. The same applies to FIG. 4.

When generating the display device images $20_1, 20_2, \ldots, 20_N$ for each of the display devices $10_1, 10_2, \ldots, 10_N$, the display image generating unit 130 generates, for each of the display devices $10_1, 10_2, \ldots, 10_N$, the display device images $20_1, 20_2, \ldots, 20_N$ in which the schedule information acquired by the schedule acquiring unit 160 is associated, in addition to the display device information acquired by the display device information acquiring unit 110 and the preset image indicated by the preset image information acquired by the preset image acquiring unit 120. The display image generating unit 130 generates a display image 200 in which a plurality of display device images $20_1, 20_2, \ldots, 20_N$ generated by the display image generating unit 130 are aligned.

Figure 5:
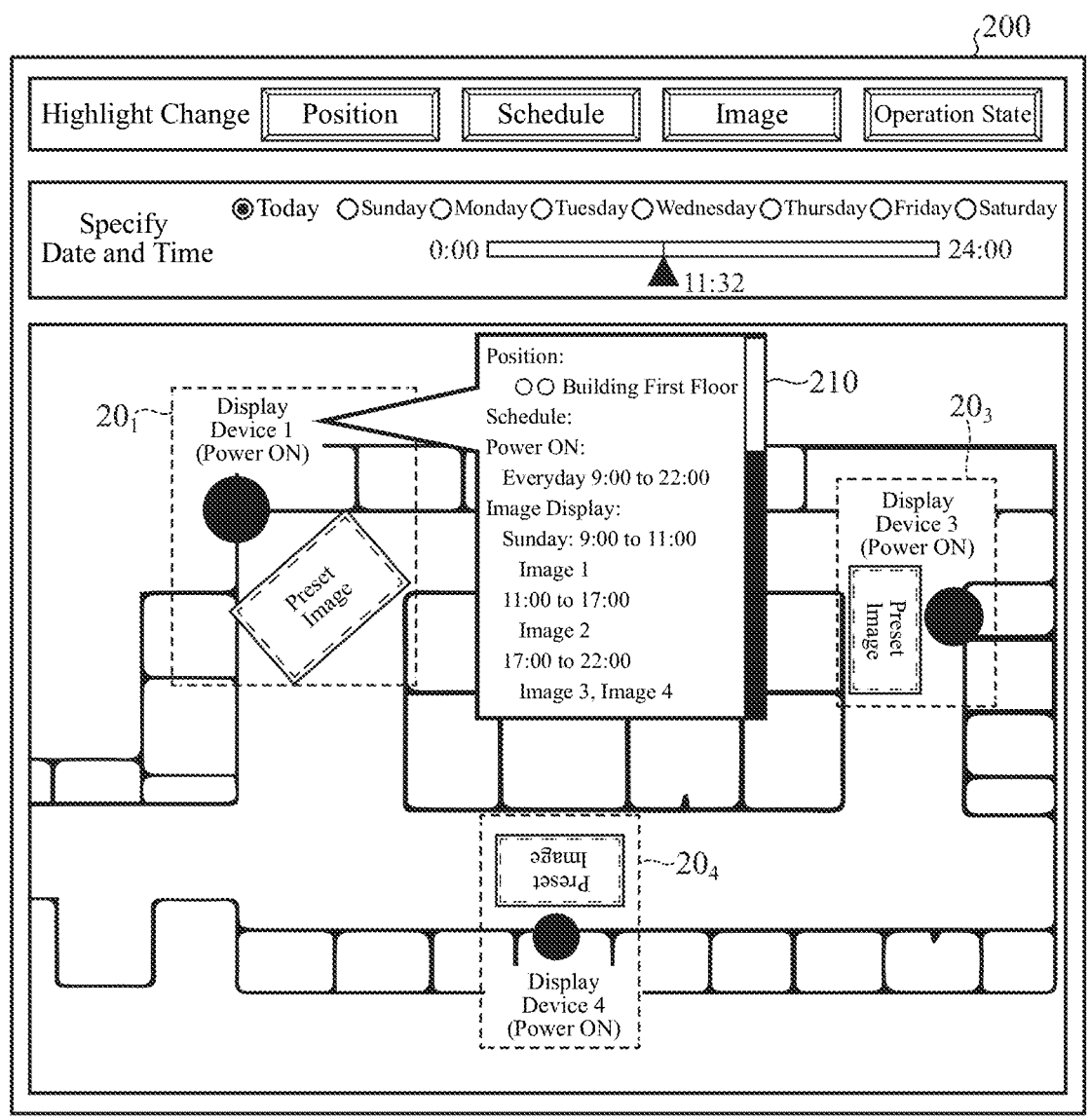
FIG. 5 is an explanatory diagram illustrating an example of a pop-up image according to the first embodiment.

FIG. 5 is an explanatory diagram illustrating an example of a pop-up image 210 according to the first embodiment.

As an example, the pop-up image 210 illustrated in FIG. 5 includes an image indicating the position of the display device $10_1$ and an image indicating the schedule of the display device $10_1$. As illustrated in FIG. 5, for example, the image indicating the schedule includes a time period in which the power is turned on, a day of the week on which image display is performed, a time period, a file name indicating preset image information, and the like. Moreover, although not illustrated in FIG. 5, the image indicating the schedule may include, for example, information indicating a sensor (not illustrated in FIG. 1), a file name indicating preset image information corresponding to detection of a pedestrian or opening and closing door in the sensor, and the like.

In the above description, the preset image acquiring unit 120 has been described as acquiring the preset image information indicating the preset image displayed at a predetermined time point such as the current time point by each of the plurality of display devices $10_1, 10_2, \ldots, 10_N$, but it is not limited thereto. For example, the preset image acquiring unit 120 may acquire preset image information indicating a preset image displayed by each of the plurality of display devices $10_1, 10_2, \ldots,$ and $10_N$ at a certain time specified by the user.

For example, the user specifies date and time via the input device 50. Specifically, for example, the user selects a desired day of the week by selecting a radio button provided for each day of the week illustrated in FIG. 3 or 4. Furthermore, the user specifies the time by moving a slider bar illustrated in FIG. 3 or 4.

The manipulation acquiring unit 101 acquires manipulation information indicating the selected day of the week and the specified time, which are manipulation information indicating the date and time.

The preset image acquiring unit 120 decides preset image information to be acquired on the basis of the manipulation information acquired by the manipulation acquiring unit 101 and the schedule information indicated by the schedule acquiring unit 160. On the basis of the decision, the preset image acquiring unit 120 acquires the preset image information indicating the preset image displayed by each of the plurality of display devices $10_1, 10_2, \ldots, 10_N$.

With the above configuration, in a case where a plurality of display devices $10_1, 10_2, \ldots, 10_N$ are arranged, the display control device 100 can cause the monitor 40 to display the display contents displayed on each of the plurality of display devices $10_1, 10_2, \ldots, 10_N$ so that the display contents can be simultaneously compared. In particular, the display control device 100 can display the preset images displayed by the plurality of display devices $10_1, 10_2, \ldots, 10_N$ on the monitor 40 so that the preset images can be simultaneously compared at a time desired by the user.

When generating the display device images $20_1, 20_2, \ldots, 20_N$ for each of the display devices $10_1, 10_2, \ldots, 10_N$, the display image generating unit 130 may decide a mode of each of the plurality of display device images $20_1, 20_2, \ldots, 20_N$ to be generated, and generate each of the plurality of display device images $20_1, 20_2, \ldots, 20_N$ on the basis of the decided mode.

The mode of the display device images $20_1, 20_2, \ldots, 20_N$ herein is to change the size or the color or thickness of the border of one or more display device images $20_1, 20_2, \ldots, 20_N$ or to add an effect such as highlight or blinking to the one or more display device images $20_1, 20_2, \ldots, 20_N$ so as to make the one or more display device images $20_1, 20_2, \ldots, 20_N$ out of the plurality of display device images $20_1, 20_2, \ldots, 20_N$ stand out as compared with the other display device images $20_1, 20_2, \ldots, 20_N$.

The display image generating unit 130 may decide a mode of each of the plurality of display device images $20_1, 20_2, \ldots, 20_N$ to be generated on the basis of the position information acquired by the display device position acquiring unit 150, and may generate each of the plurality of display device images $20_1, 20_2, \ldots, 20_N$ on the basis of the decided mode.

Specifically, for example, the display image generating unit 130 decides a mode of each of the display device images $20_1, 20_2, \ldots, 20_N$ corresponding to the display devices $10_1, 10_2, \ldots, 10_N$ at the positions closest to the predetermined positions in the facility so as to be more conspicuous than the other display device images $20_1, 20_2, \ldots, 20_N$. The display image generating unit 130 generates each of the plurality of display device images $20_1, 20_2, \ldots, 20_N$ on the basis of the decided mode.

The display image generating unit 130 may decide the position in the facility on the basis of the manipulation information acquired by the manipulation acquiring unit 101, and decide a mode of each of the display device images $20_1, 20_2, \ldots, 20_N$ corresponding to the display devices $10_1, 10_2, \ldots, 10_N$ at the positions closest to the decided positions, so as to be more conspicuous than the other display device images $20_1, 20_2, \ldots, 20_N$.

Note that the display image generating unit 130 only needs to decide the mode of each of the plurality of display device images $20_1, 20_2, \ldots, 20_N$ to be generated on the basis of the position information, and the method of deciding the mode is not limited to the above-described method.

For example, the display image generating unit 130 may decide a mode of each of the display device images $20_1, 20_2, \ldots, 20_N$ corresponding to the display devices $10_1, 10_2, \ldots, 10_N$ arranged in the predetermined regions in the facility such as predetermined floor in the facility, so as to be more conspicuous than the other display device images $20_1, 20_2, \ldots, 20_N$.

Furthermore, for example, in a case where the display devices $10_1, 10_2, \ldots, 10_N$ are movable in the facility by self-propelling, the display image generating unit 130 may calculate the movement amount, the movement speed, or the like of the display devices $10_1, 10_2, \ldots, 10_N$ on the basis of the position information, and decide the mode of each of the display device images, $20_1, 20_2, \ldots, 20_N$ corresponding to the display devices $10_1, 10_2, \ldots, 10_N$ which meet predetermined conditions so as to be more conspicuous than the other display device images $20_1, 20_2, \ldots, 20_N$ on the basis of the calculated movement amount, movement speed, or the like.

Moreover, the display image generating unit 130 may decide a mode of each of the plurality of display device images $20_1, 20_2, \ldots, 20_N$ to be generated on the basis of the schedule information acquired by the schedule acquiring unit 160, and may generate each of the plurality of display device images $20_1, 20_2, \ldots, 20_N$ on the basis of the decided mode.

Specifically, for example, the display image generating unit 130 decides the mode of each of the display device images $20_1, 20_2, \ldots, 20_N$ corresponding to the display devices, $10_1, 10_2, \ldots, 10_N$ in which the preset images to be displayed have been changed in accordance with the schedule indicated by the schedule information, . . . , so as to be more conspicuous than the other display device images $20_1, 20_2, \ldots, 20_N$. The display image generating unit 130 generates each of the plurality of display device images $20_1, 20_2, \ldots, 20_N$ on the basis of the decided mode.

Note that the display image generating unit 130 only needs to decide the mode of each of the plurality of display device images $20_1, 20_2, \ldots, 20_N$ to be generated on the basis of the schedule information, and the method of deciding the mode is not limited to the above-described method.

For example, the display image generating unit 130 decides the mode of each of the display device images $20_1, 20_2, \ldots, 20_N$ corresponding to the display devices, $10_1, 10_2, \ldots, 10_N$ in which the preset images to be displayed have been changed in a predetermined period in accordance with the schedule indicated by the schedule information, . . . , so as to be more conspicuous than the other display device images $20_1, 20_2, \ldots, 20_N$.

Furthermore, the display image generating unit 130 may decide the mode of each of the plurality of display device images $20_1, 20_2, \ldots, 20_N$ to be generated on the basis of the preset image information acquired by the preset image acquiring unit 120, and may generate each of the plurality of display device images $20_1, 20_2, \ldots, 20_N$ on the basis of the decided mode.

Specifically, for example, the display image generating unit 130 decides the mode of each of the display device images $20_1, 20_2, \ldots, 20_N$ corresponding to the display devices $10_1, 10_2, \ldots, 10_N$ which display preset images indicated by the preset image information having the latest creation date and time, update date and time, or the like among the plurality of pieces of preset image information acquired by the preset image acquiring unit 120, . . . , so as to be more conspicuous than the other display device images $20_1, 20_2, \ldots, 20_N$. The display image generating unit 130 generates each of the plurality of display device images $20_1, 20_2, \ldots, 20_N$ on the basis of the decided mode.

Note that it is sufficient that the display image generating unit 130 decides the mode of each of the plurality of display device images $20_1, 20_2, \ldots, 20_N$ to be generated on the basis of the preset image information, and the method of deciding the mode is not limited to the above-described method.

For example, the display image generating unit 130 may decide a mode of each of the display device images $20_1, 20_2, \ldots, 20_N$ corresponding to the display devices $10_1, 10_2, \ldots, 10_N$ that display the preset image indicated by the preset image information or the preset image in which some of the preset images are the same among the plurality of pieces of preset image information acquired by the preset image acquiring unit 120, so as to be more conspicuous than the other display device images $20_1, 20_2, \ldots, 20_N$.

Moreover, the display image generating unit 130 may decide a mode of each of the plurality of display device images $20_1, 20_2, \ldots, 20_N$ to be generated on the basis of the operation state information acquired by the operation state acquiring unit 140, and generate each of the plurality of display device images $20_1, 20_2, \ldots, 20_N$ on the basis of the decided mode.

Specifically, for example, the display image generating unit 130 decides a mode of each of the display device images $20_1, 20_2, \ldots, 20_N$ corresponding to the display devices $10_1, 10_2, \ldots,$ and $10_N$ corresponding to the operation state information indicating a failure of the display devices $10_1, 10_2, \ldots, 10_N$ among the plurality of pieces of operation state information acquired by the operation state acquiring unit 140, so as to be more conspicuous than the other display device images $20_1, 20_2, \ldots, 20_N$. The display image generating unit 130 generates each of the plurality of display device images $20_1, 20_2, \ldots, 20_N$ on the basis of the decided mode.

Note that the display image generating unit 130 only needs to decide the mode of each of the plurality of display device images $20_1, 20_2, \ldots, 20_N$ to be generated on the basis of the operation state information, and the method of deciding the mode is not limited to the above-described method.

For example, the display image generating unit 130 may decide a mode of each of the display device images $20_1, 20_2, \ldots, 20_N$ corresponding to the display devices $10_1, 10_2, \ldots, 10_N$ corresponding to the operation state information indicating ON state of the display devices $10_1, 10_2, \ldots, 10_N$ among the plurality of pieces of operation state information acquired by the operation state acquiring unit 140, so as to be more conspicuous than the other display device images $20_1, 20_2, \ldots, 20_N$.

Moreover, for example, the display image generating unit 130 may decide a mode of each of the display device images $20_1, 20_2, \ldots, 20_N$ corresponding to the display devices $10_1, 10_2, \ldots, 10_N$ corresponding to the operation state information indicating that the display state of preset images in the display devices $10_1, 10_2, \ldots,$ and $10_N$ is not good among the plurality of pieces of operation state information acquired by the operation state acquiring unit 140, so as to be more conspicuous than the other display device images $20_1, 20_2, \ldots, 20_N$.

Furthermore, for example, the display image generating unit 130 may decide a mode of each of the display device images $20_1, 20_2, \ldots, 20_N$ corresponding to the display devices $10_1, 10_2, \ldots, 10_N$ corresponding to the operation state information indicating that the installation date of the display devices $10_1, 10_2, \ldots, 10_N$ is the latest among the plurality of pieces of operation state information acquired by the operation state acquiring unit 140, so as to be more conspicuous than the other display device images $20_1, 20_2, \ldots, 20_N$.

In addition, the display image generating unit 130 may decide a mode of each of the plurality of display device images $20_1, 20_2, \ldots, 20_N$ to be generated on the basis of the manipulation information acquired by the manipulation acquiring unit 101, and generate each of the plurality of display device images $20_1, 20_2, \ldots, 20_N$ on the basis of the decided mode.

Specifically, for example, the user selects any of a plurality of buttons for highlight change provided to change the mode illustrated in FIG. 3 or 4. The highlight change button is, for example, as illustrated in FIG. 3 or 4, a position button for deciding the mode of the display device images $20_1, 20_2, \ldots, 20_N$ on the basis of the positions of the display devices $10_1, 10_2, \ldots, 10_N$, a schedule button for deciding the mode of the display device images $20_1, 20_2, \ldots, 20_N$ on the basis of the schedule of the display devices $10_1, 10_2, \ldots, 10_N$, a preset image button for deciding the mode of the display device images $20_1, 20_2, \ldots, 20_N$ on the basis of the preset images displayed by the display device $10_1$, $10_2$, ..., $10_N$, an operation state button for deciding the mode of the display device images $20_1$, $20_2$, ..., $20_N$ on the basis of operation state information indicating the operation state of the display devices $10_1$, $10_2$, ..., $10_N$, or the like.

The display image generating unit 130 decides a mode of each of the display device images $20_1$, $20_2$, ..., $20_N$ meeting a predetermined condition, so as to be more conspicuous than the other display device images $20_1$, $20_2$, ..., $20_N$ on the basis of the manipulation information indicating the manipulation in which one of the plurality of highlight change buttons is selected. The display image generating unit 130 generates each of the plurality of display device images $20_1$, $20_2$, ..., $20_N$ on the basis of the decided mode.

With the above configuration, in a case where a plurality of display devices $10_1$, $10_2$, ..., $10_N$ are arranged, the display control device 100 can cause the monitor 40 to display the display contents displayed on each of the plurality of display devices $10_1$, $10_2$, ..., $10_N$ so that the display contents can be simultaneously compared. In particular, the display control device 100 can display the display device images $20_1$, $20_2$, ..., $20_N$ to be noted on the monitor 40 so as to be more conspicuous than the other display device images $20_1$, $20_2$, ..., $20_N$.

The display control device 100 may be able to edit the schedule information acquired by the schedule acquiring unit 160.

For example, the schedule acquiring unit 160 selects one or more display devices $10_1$, $10_2$, ..., $10_N$ among the plurality of display devices $10_1$, $10_2$, ..., $10_N$ on the basis of the manipulation information acquired by the manipulation acquiring unit 101, and acquires at least schedule information indicating the schedule of the selected one or more display devices $10_1$, $10_2$, ..., $10_N$.

The schedule editing unit 190 edits the schedule information acquired by the schedule acquiring unit 160 on the basis of the manipulation information acquired by the manipulation acquiring unit 101.

Specifically, for example, the schedule editing unit 190 edits schedule information used when the display devices $10_1$, $10_2$, ..., and $10_N$ display preset images on the basis of the manipulation information.

More specifically, for example, the schedule editing unit 190 edits the schedule information by editing the display period of the preset image displayed by the display devices $10_1$, $10_2$, ..., $10_N$ on the basis of the manipulation information.

The schedule output unit 191 outputs the edited schedule information edited by the schedule editing unit 190. For example, the schedule output unit 191 outputs the edited schedule information edited by the schedule editing unit 190 to the display devices $10_1$, $10_2$, ..., $10_N$ or the storage device 20.

The display devices $10_1$, $10_2$, ..., $10_N$ display the preset images in accordance with the schedule indicated by the edited schedule information output by the schedule output unit 191.

With the above configuration, in a case where a plurality of display devices $10_1$, $10_2$, ..., $10_N$ are arranged, the display control device 100 can allow the user to edit the schedule information while displaying the display contents displayed on the plurality of display devices $10_1$, $10_2$, ..., $10_N$ on the monitor 40 so that the display contents can be simultaneously compared with each other.

The display control device 100 may be capable of newly selecting a preset image to be displayed by the display devices $10_1$, $10_2$, ..., $10_N$ and then editing the schedule information acquired by the schedule acquiring unit 160 so that the preset image is displayed in the display devices $10_1$, $10_2$, ..., $10_N$.

The image selection unit 180 selects image information indicating an image on the basis of the manipulation information acquired by the manipulation acquiring unit 101.

Specifically, for example, the image selection unit 180 selects image information indicated by images to be displayed on the display devices $10_1$, $10_2$, ..., $10_N$ on the basis of the manipulation information from one or more pieces of image information stored in advance in the storage device 20.

The schedule editing unit 190 edits the schedule information on the basis of the manipulation information acquired by the manipulation acquiring unit 101 so that the image indicated by the image information selected by the image selection unit 180 is displayed on one or more display devices $10_1$, $10_2$, ..., $10_N$ corresponding to the schedule information acquired by the schedule acquiring unit 160.

With the above configuration, in a case where a plurality of display devices $10_1$, $10_2$, ..., $10_N$ are arranged, the display control device 100 can allow the user to edit the schedule information while displaying the display contents displayed on the plurality of display devices $10_1$, $10_2$, ..., $10_N$ on the monitor 40 so that the display contents can be simultaneously compared with each other.

Note that, as an example, the display control device 100 selects the image information indicated by the image to be displayed on the display devices $10_1$, $10_2$, ..., $10_N$ from one or more pieces of image information stored in advance in the storage device 20 on the basis of the manipulation information, but the display control device 100 is not limited thereto.

For example, the display control device 100 may acquire image information selected by the image selection unit 180 from the storage device 20 or the like by an image acquiring unit (not illustrated), and output the acquired image information to one or more display devices $10_1$, $10_2$, ..., $10_N$ corresponding to schedule information acquired by the schedule acquiring unit 160 by an image output unit (not illustrated).

In addition, the display control device 100 may be capable of editing or generating image information indicating an image to be displayed on the display devices $10_1$, $10_2$, ..., $10_N$.

Specifically, for example, the display control device 100 may acquire the image information selected by the image selection unit 180 from the storage device 20 or the like by the image acquiring unit (not illustrated), edit the image information acquired by the image editing unit (not illustrated) on the basis of the manipulation information acquired by the manipulation acquiring unit 101, and output the edited image information to the storage device 20 or the like by the image output unit (not illustrated).

Note that the method of editing the schedule information and the method of editing the image information are both publicly known, and thus detailed description thereof will be omitted.

The hardware configuration of the main part of the display control device 100 according to the first embodiment will be described with reference to FIGS. 6A and 6B.

Figure 6A:
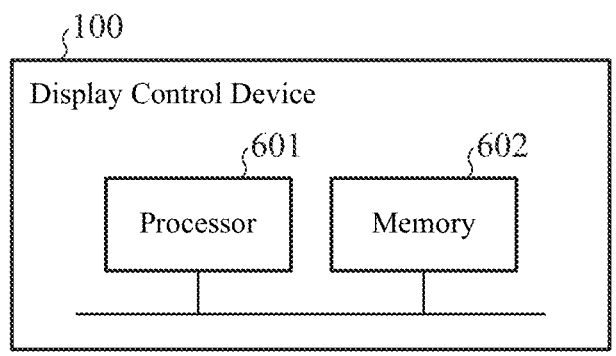
FIGS. 6A and 6B are diagrams illustrating an example of hardware configuration of the display control device according to the first embodiment.
Figure 6B:
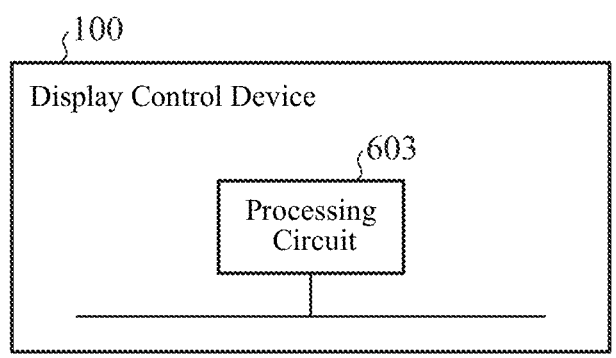

FIGS. 6A and 6B are diagrams illustrating an example of the hardware configuration of the display control device 100 according to the first embodiment.

As illustrated in FIG. 6A, the display control device 100 is configured by a computer, and the computer has a processor 601 and a memory 602. The memory 602 stores programs for causing the computer to function as the manipulation acquiring unit 101, the display device information acquiring unit 110, the preset image acquiring unit 120, the display image generating unit 130, the operation state acquiring unit 140, the display device position acquiring unit 150, the schedule acquiring unit 160, the map acquiring unit 170, the image selection unit 180, the schedule editing unit 190, the schedule output unit 191, and the display image outputting unit 199. The processor 601 reads out and executes the program stored in the memory 602, thereby implementing the functions of the manipulation acquiring unit 101, the display device information acquiring unit 110, the preset image acquiring unit 120, the display image generating unit 130, the operation state acquiring unit 140, the display device position acquiring unit 150, the schedule acquiring unit 160, the map acquiring unit 170, the image selection unit 180, the schedule editing unit 190, the schedule output unit 191, and the display image outputting unit 199.

Moreover, as illustrated in FIG. 6B, the functions of the manipulation acquiring unit 101, the display device information acquiring unit 110, the preset image acquiring unit 120, the display image generating unit 130, the operation state acquiring unit 140, the display device position acquiring unit 150, the schedule acquiring unit 160, the map acquiring unit 170, the image selection unit 180, the schedule editing unit 190, the schedule output unit 191 and the display image outputting unit 199 may be implemented by a processing circuit 603.

Furthermore, the display control device 100 may include the processor 601, the memory 602, and the processing circuit 603 (not illustrated). In this case, some of the functions of the manipulation acquiring unit 101, the display device information acquiring unit 110, the preset image acquiring unit 120, the display image generating unit 130, the operation state acquiring unit 140, the display device position acquiring unit 150, the schedule acquiring unit 160, the map acquiring unit 170, the image selection unit 180, the schedule editing unit 190, the schedule output unit 191 and the display image outputting unit 199 may be implemented by the processor 601 and the memory 602, and the remaining functions may be implemented by the processing circuit 603.

The processor 601 uses, for example, a central processing unit (CPU), a graphics processing unit (GPU), a microprocessor, a microcontroller, or a digital signal processor (DSP).

The memory 602 uses, for example, a semiconductor memory or a magnetic disk. More specifically, the memory 602 uses, for example, a random access memory (RAM), a read only memory (ROM), a flash memory, an erasable programmable read only memory (EPROM), an electrically erasable programmable read only memory (EEPROM), an SSD, or an HDD.

The processing circuit 603 uses, for example, an application specific integrated circuit (ASIC), a programmable logic device (PLD), a field-programmable gate array (FPGA), a system-on-a-chip (SoC), or a system large-scale integration (LSI).

The operation of the display control device 100 according to the first embodiment will be described with reference to FIGS. 7A and 7B.

Figure 7A:
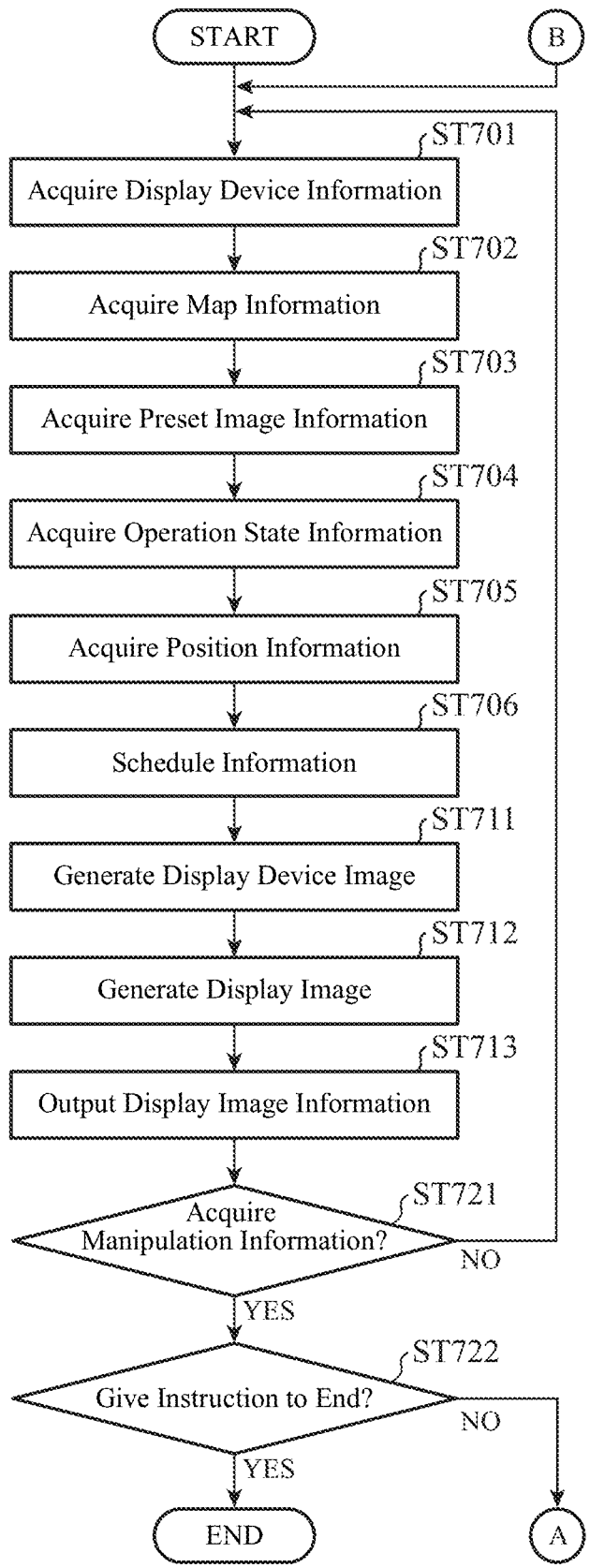
FIG. 7A is a part of a flowchart illustrating an example of processing of the display control device according to the first embodiment.
Figure 7B:
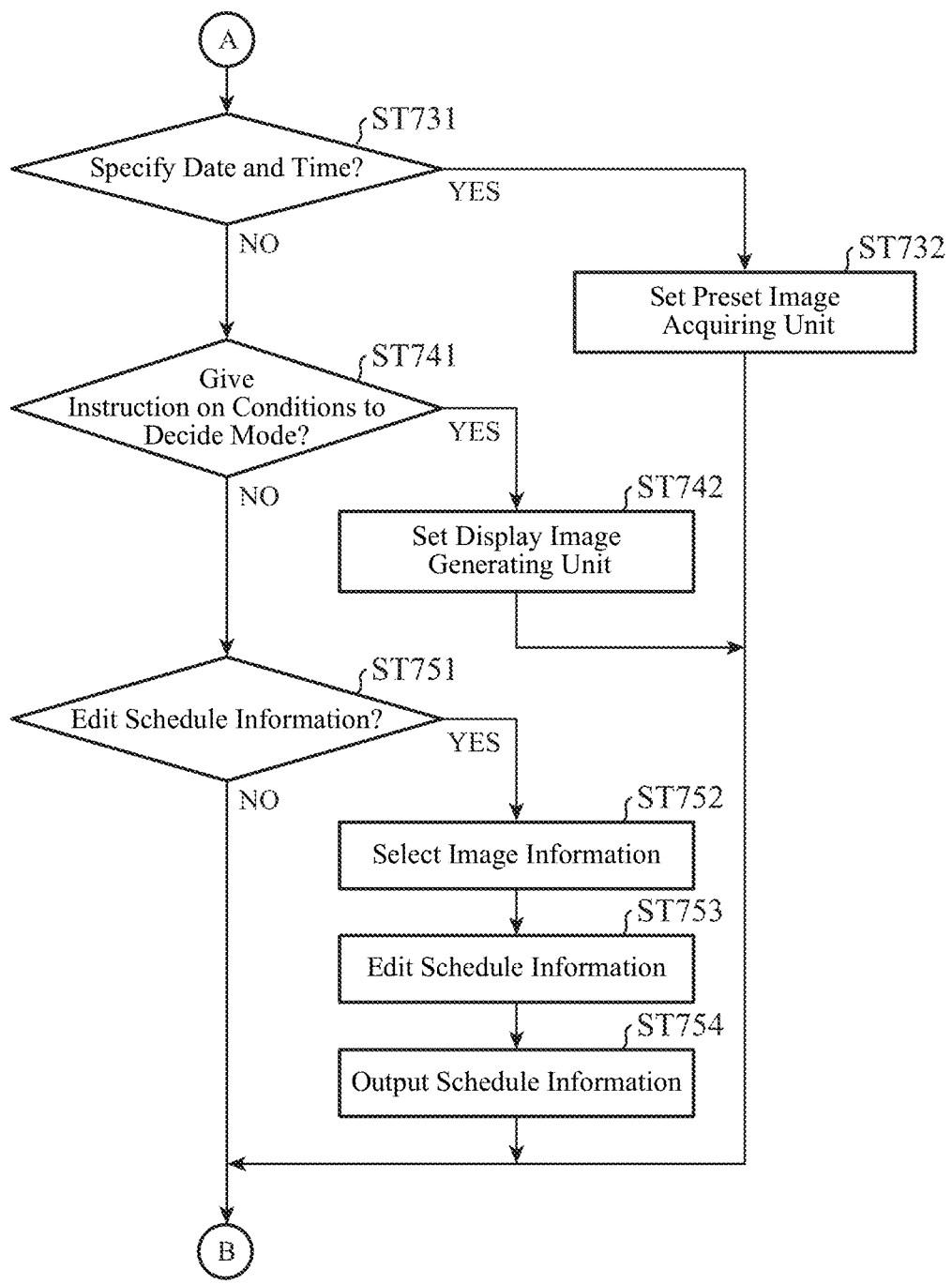
FIG. 7B is the remaining part of the flowchart illustrating the example of processing of the display control device according to the first embodiment.

FIG. 7A is a part of a flowchart illustrating an example of processing of the display control device 100 according to the first embodiment, and FIG. 7B is the remainder of the flowchart illustrating an example of processing of the display control device 100 according to the first embodiment. Hereinafter, FIGS. 7A and 7B will be collectively referred to as FIG. 7.

First, in step ST701, the display device information acquiring unit 110 acquires the display device information.

Next, in step ST702, the map acquiring unit 170 acquires map information.

Next, in step ST703, the preset image acquiring unit 120 acquires the preset image information.

Next, in step ST704, the operation state acquiring unit 140 acquires the operation state information.

Next, in step ST705, the display device position acquiring unit 150 acquires the position information.

Next, in step ST706, the schedule acquiring unit 160 acquires the schedule information.

Next, in step ST711, the display image generating unit 130 generates the display device images $20_1, 20_2, \ldots, 20_N$.

Next, in step ST712, the display image generating unit 130 generates the display image 200.

Next, in step ST713, the display image outputting unit 199 outputs the display image information.

Next, in step ST721, the manipulation acquiring unit 101 determines whether or not the manipulation information has been acquired.

In a case where the manipulation acquiring unit 101 has determined in step ST721 that the manipulation information has not been acquired, the display control device 100 returns to step ST701 and repeatedly executes the processing of the flowchart illustrated in FIG. 7.

In a case where the manipulation acquiring unit 101 has determined in step ST721 that the manipulation information has been acquired, the manipulation acquiring unit 101 determines whether or not the user manipulation indicated by the acquired manipulation information is an instruction to end the processing of the display control device 100 in step ST722.

In step ST722, in a case where the manipulation acquiring unit 101 has determined that the user manipulation indicated by the manipulation information is an instruction to end the processing of the display control device 100, the display control device 100 ends the processing of the flowchart illustrated in FIG. 7.

In step ST722, in a case where the manipulation acquiring unit 101 has determined that the user manipulation indicated by the manipulation information is not an instruction to end the processing of the display control device 100, in step ST731, the preset image acquiring unit 120 determines whether or not the user manipulation indicated by the manipulation information specifies date and time.

In step ST731, in a case where the preset image acquiring unit 120 has determined that the user manipulation indicated by the manipulation information is to specify date and time, in step ST732, the preset image acquiring unit 120 sets the preset image acquiring unit 120 to acquire the preset image information corresponding to the date and time when the preset image acquiring unit 120 acquires the preset image information the next time or later. After step ST732, the display control device 100 returns to step ST701 and repeatedly executes the processing of the flowchart illustrated in FIG. 7.

In step ST731, in a case where the preset image acquiring unit 120 has determined that the user manipulation indicated by the manipulation information does not specify the date and time, in step ST741, the display image generating unit 130 determines whether or not the user manipulation indicated by the manipulation information gives an instruction on a condition for deciding the mode of each of the display device images $20_1, 20_2, \ldots, 20_N$.

In step ST741, in a case where the display image generating unit 130 has determined that the user manipulation gives an instruction on a condition for deciding the mode of the display device images $20_1, 20_2, \ldots, 20_N$, in step ST742, the display image generating unit 130 sets the display image generating unit 130 so that when the display image generating unit 130 generates the display device images $20_1, 20_2, \ldots, 20_N$ for the next and subsequent times, the display image generating unit 130 decides the mode of the display device images $20_1, 20_2, \ldots, 20_N$ in accordance to the condition, and generates the display device images $20_1, 20_2, \ldots, 20_N$ on the basis of the decided mode. After step ST742, the display control device 100 returns to step ST701 and repeatedly executes the processing of the flowchart illustrated in FIG. 7.

In step ST741, in a case where the display image generating unit 130 has determined that the user manipulation does not give an instruction on the condition for deciding the mode of the display device images $20_1, 20_2, \ldots, 20_N$, in step ST751, the schedule editing unit 190 determines whether or not the user manipulation indicated by the manipulation information is for editing the schedule information.

In step ST751, in a case where the schedule editing unit 190 has determined that the user manipulation is for editing the schedule information, the image selection unit 180 selects the image information in step ST752.

After step ST752, in step ST753, the schedule editing unit 190 edits the schedule information.

After step ST753, in step ST754, the schedule output unit 191 outputs schedule information.

After step ST754, the display control device 100 returns to step ST701 and repeatedly executes the processing of the flowchart illustrated in FIG. 7.

In step ST751, in a case where the schedule editing unit 190 determines that the user manipulation is not for editing the schedule information, the display control device 100 discards the manipulation information, returns to step ST701, and repeatedly executes the processing of the flowchart illustrated in FIG. 7.

Note that the processing from step ST701 to step ST706 only needs to be executed before the processing of step ST711 is executed, and the order of the processing is arbitrary. Moreover, the processing of steps ST701 and ST702 only needs to be executed only once, and the second and subsequent steps can be omitted.

As described above, the display control device 100 according to the first embodiment includes: the display device information acquiring unit 110 that acquires display device information indicating each of the plurality of display devices $10_1, 10_2, \ldots, 10_N$ that is disposed in a facility and displays a preset image; the preset image acquiring unit 120 that acquires the preset image information indicating a preset image displayed by each of the plurality of display devices $10_1, 10_2, \ldots, 10_N$; the display image generating unit 130 that generates the display image 200, wherein the display image generating unit generates, for each of the display devices $10_1, 10_2, \ldots, 10_N$, the display device images $20_1, 20_2, \ldots, 20_N$ in which the display device information acquired by the display device information acquiring unit 110 and the preset image indicated by the preset image information acquired by the preset image acquiring unit 120 are associated with each other, and generates the display image 200 in which a plurality of the display device images $20_1, 20_2, \ldots, 20_N$ generated are aligned; and the display image outputting unit 199 that outputs the display image 200 generated by the display image generating unit 130 as the display image information.

With this configuration, in a case where a plurality of display devices $10_1, 10_2, \ldots, 10_N$ are arranged, the display control device 100 enables display contents displayed on each of the plurality of display devices $10_1, 10_2, \ldots, 10_N$ to be compared simultaneously.

Moreover, the display control device 100 according to the first embodiment includes the operation state acquiring unit 140 that acquires the operation state information on the display devices $10_1, 10_2, \ldots, 10_N$ in addition to the above-described configuration, and the display image generating unit 130 is configured to generate, for each of the display devices $10_1, 10_2, \ldots, 10_N$, the display device images $20_1, 20_2, \ldots, 20_N$ in which the operation state information acquired by the operation state acquiring unit 140 is associated in addition to the display device information acquired by the display device information acquiring unit 110 and the preset images indicated by the preset image information acquired by the preset image acquiring unit 120.

With such a configuration, in a case where a plurality of display devices $10_1, 10_2, \ldots, 10_N$ are arranged, the display control device 100 enables the operation state of each of the plurality of display devices $10_1, 10_2, \ldots, 10_N$ to be confirmed simultaneously while enabling the display contents displayed on each of the plurality of display devices $10_1, 10_2, \ldots, 10_N$ to be compared simultaneously.

Furthermore, the display control device 100 according to the first embodiment includes, in addition to the above-described configuration, the display device position acquiring unit 150 that acquires position information indicating a position where each of the plurality of display devices $10_1, 10_2, \ldots, 10_N$ is arranged, and the display image generating unit 130 is configured to generate, for each of the display devices $10_1, 10_2, \ldots, 10_N$, the display device images $20_1, 20_2, \ldots, 20_N$ in which the position information acquired by the display device position acquiring unit 150 is associated, in addition to the display device information acquired by the display device information acquiring unit 110 and the preset image indicated by the preset image information acquired by the preset image acquiring unit 120.

With this configuration, in a case where the plurality of display devices $10_1, 10_2, \ldots, 10_N$ are arranged, the display control device 100 enables the positions where the plurality of display devices $10_1, 10_2, \ldots, 10_N$ is arranged to be confirmed simultaneously while enabling the each of display contents displayed on the plurality of display devices $10_1, 10_2, \ldots, 10_N$ to be compared simultaneously For example, in particular, in a case where each of the plurality of display devices $10_1, 10_2, \ldots, 10_N$ is movable or movable without being fixed to a structure or the like constituting a facility, the display control device 100 enables the position where each of the plurality of display devices $10_1, 10_2, \ldots, 10_N$ to be confirm simultaneously is arranged at the current time.

Furthermore, in addition to the above-described configuration, the display control device 100 according to the first embodiment includes the schedule acquiring unit 160 that acquires schedule information indicating a schedule in which each of the plurality of display devices $10_1, 10_2, \ldots, 10_N$ displays a preset image, and the display image generating unit 130 is configured to generate, for each of the display devices $10_1, 10_2, \ldots, 10_N$, the display device images $20_1, 20_2, \ldots, 20_N$ in which the schedule information acquired by the schedule acquiring unit 160 is associated, in addition to the display device information acquired by the display device information acquiring unit 110 and the preset images indicated by the preset image information acquired by the preset image acquiring unit 120.

With this configuration, in a case where a plurality of display devices $10_1, 10_2, \ldots, 10_N$ are arranged, the display control device 100 can confirm the schedule of each of the plurality of display devices $10_1$, $10_2$, ..., $10_N$ while enabling the display contents displayed on each of the plurality of display devices $10_1$, $10_2$, ..., $10_N$. to be compared simultaneously Moreover, in addition to the above-described configuration, the display control device 100 according to the first embodiment includes the schedule acquiring unit 160 that acquires schedule information indicating a schedule in which each of the plurality of display devices $10_1$, $10_2$, ..., $10_N$ displays a preset image, and the manipulation acquiring unit 101 that acquires manipulation information indicating user manipulation. The preset image acquiring unit 120 is configured to decide the preset image information to be acquired on the basis of the manipulation information acquired by the manipulation acquiring unit 101 and the schedule information indicated by the schedule acquiring unit 160.

With this configuration, in a case where a plurality of display devices $10_1$, $10_2$, ..., $10_N$ are arranged, the display control device 100 enables display contents displayed on each of the plurality of display devices $10_1$, $10_2$, ..., $10_N$ to be compared simultaneously at a date and time specified by user manipulation.

Moreover, in addition to the above-described configuration, the display control device 100 according to the first embodiment includes the manipulation acquiring unit 101 that acquires the manipulation information indicating the user manipulation, and the display image generating unit 130 is configured to decide a mode of each of the plurality of display device images $20_1$, $20_2$, ..., $20_N$ to be generated on the basis of the manipulation information acquired by the manipulation acquiring unit 101, and generate each of the plurality of display device images $20_1$, $20_2$, ..., $20_N$ on the basis of the decided mode.

With this configuration, in a case where a plurality of display devices $10_1$, $10_2$, ..., $10_N$ are arranged, the display control device 100 can display the display device images $20_1$, $20_2$, ..., $20_N$ to be noted on the monitor 40 so as to be more conspicuous than the other display device images $20_1$, $20_2$, ..., $20_N$ while enabling display contents displayed on each of the plurality of display devices $10_1$, $10_2$, ..., $10_N$ to be simultaneously compared.

Moreover, in addition to the above-described configuration, the display control device 100 according to the first embodiment includes the display device position acquiring unit 150 that acquires position information indicating a position where each of the plurality of display devices $10_1$, $10_2$, ..., $10_N$ is arranged, and the display image generating unit 130 is configured to decide a mode of each of the plurality of display device images $20_1$, $20_2$, ..., $20_N$ to be generated on the basis of the position information acquired by the display device position acquiring unit 150, and generate each of the plurality of display device images $20_1$, $20_2$, ..., $20_N$ on the basis of the decided mode.

With this configuration, in a case where a plurality of display devices $10_1$, $10_2$, ..., $10_N$ are arranged, the display control device 100 can display the display device images $20_1$, $20_2$, ..., $20_N$ to be noted on the monitor 40 so as to be more conspicuous than the other display device images $20_1$, $20_2$, ..., $20_N$ while enabling display contents displayed on each of the plurality of display devices $10_1$, $10_2$, ..., $10_N$ to be simultaneously compared.

Furthermore, in addition to the above-described configuration, the display control device 100 according to the first embodiment includes the schedule acquiring unit 160 that acquires schedule information indicating a schedule in which each of the plurality of display devices $10_1$, $10_2$, ..., $10_N$ displays a preset image, and the display image generating unit 130 is configured to decide a mode of each of the plurality of display device images $20_1$, $20_2$, ..., $20_N$ to be generated on the basis of the schedule information acquired by the schedule acquiring unit 160, and generate each of the plurality of display device images $20_1$, $20_2$, ..., $20_N$ on the basis of the decided mode.

With this configuration, in a case where a plurality of display devices $10_1$, $10_2$, ..., $10_N$ are arranged, the display control device 100 can display the display device images $20_1$, $20_2$, ..., $20_N$ to be noted on the monitor 40 so as to be more conspicuous than the other display device images $20_1$, $20_2$, ..., $20_N$ while enabling display contents displayed on each of the plurality of display devices $10_1$, $10_2$, ..., $10_N$ to be simultaneously compared.

In addition, in the display control device 100 according to the first embodiment, in the above-described configuration, the display image generating unit 130 is configurated to decide a mode of each of the plurality of display device images $20_1$, $20_2$, ..., $20_N$ to be generated on the basis of the preset image information acquired by the preset image acquiring unit 120, and generate each of the plurality of display device images $20_1$, $20_2$, ..., $20_N$ on the basis of the decided mode.

With this configuration, in a case where a plurality of display devices $10_1$, $10_2$, ..., $10_N$ are arranged, the display control device 100 can display the display device images $20_1$, $20_2$, ..., $20_N$ to be noted on the monitor 40 so as to be more conspicuous than the other display device images $20_1$, $20_2$, ..., $20_N$ while enabling the display contents displayed on each of the plurality of display devices $10_1$, $10_2$, ..., $10_N$ to be compared simultaneously.

Furthermore, in addition to the above-described configuration, the display control device 100 according to the first embodiment includes the operation state acquiring unit 140 that acquires the operation state information on the display devices $10_1$, $10_2$, ..., $10_N$, and the display image generating unit 130 is configured to decide a mode of each of the plurality of display device images $20_1$, $20_2$, ..., $20_N$ to be generated on the basis of the operation state information acquired by the operation state acquiring unit 140, and generate each of the plurality of display device images $20_1$, $20_2$, ..., $20_N$ on the basis of the decided mode.

With this configuration, in a case where a plurality of display devices $10_1$, $10_2$, ..., $10_N$ are arranged, the display control device 100 can display the display device images $20_1$, $20_2$, ..., $20_N$ to be noted on the monitor 40 so as to be more conspicuous than the other display device images $20_1$, $20_2$, ..., $20_N$ while enabling display contents displayed on each of the plurality of display devices $10_1$, $10_2$, ..., $10_N$ to be simultaneously compared.

Moreover, in addition to the above-described configuration, the display control device 100 according to the first embodiment includes the map acquiring unit 170 that acquires a map image indicating a map of an inside of a facility as map information, and the display device position acquiring unit 150 that acquires position information indicating a position at which each of the plurality of display devices $10_1$, $10_2$, ..., $10_N$ is arranged, and the display image generating unit 130 is configured to generate the display image 200 in which each of the plurality of display device images $20_1$, $20_2$, ..., $20_N$ generated by the display image generating unit 130 is arranged on a map image indicated by the map information acquired by the map acquiring unit 170 in association with a position at which each of the plurality of display devices $10_1$, $10_2$, ..., $10_N$ indicated by the position information acquired by the display device position acquiring unit 150 is arranged.

With this configuration, in a case where a plurality of display devices $10_1, 10_2, \ldots, 10_N$ are arranged, the display control device 100 enables display contents displayed on each of the plurality of display devices $10_1, 10_2, \ldots, 10_N$ to be compared simultaneously.

In addition, in the display control device 100 according to the first embodiment, in the above-described configuration, the display image generating unit 130 is configured to generate the display image 200 in which the plurality of display device images $20_1, 20_2, \ldots, 20_N$ generated by the display image generating unit 130 are arranged in a lattice pattern.

With this configuration, in a case where a plurality of display devices $10_1, 10_2, \ldots, 10_N$ are arranged, the display control device 100 enables display contents displayed on each of the plurality of display devices $10_1, 10_2, \ldots, 10_N$ to be compared simultaneously.

Second Embodiment

A display control device 100a according to a second embodiment will be described with reference to FIGS. 8 to 10 and FIGS. 11A and 11B.

The configuration of a main part of a display system 1a according to the second embodiment to which the display control device 100a according to the second embodiment is applied will be described with reference to FIG. 8.

Figure 8:
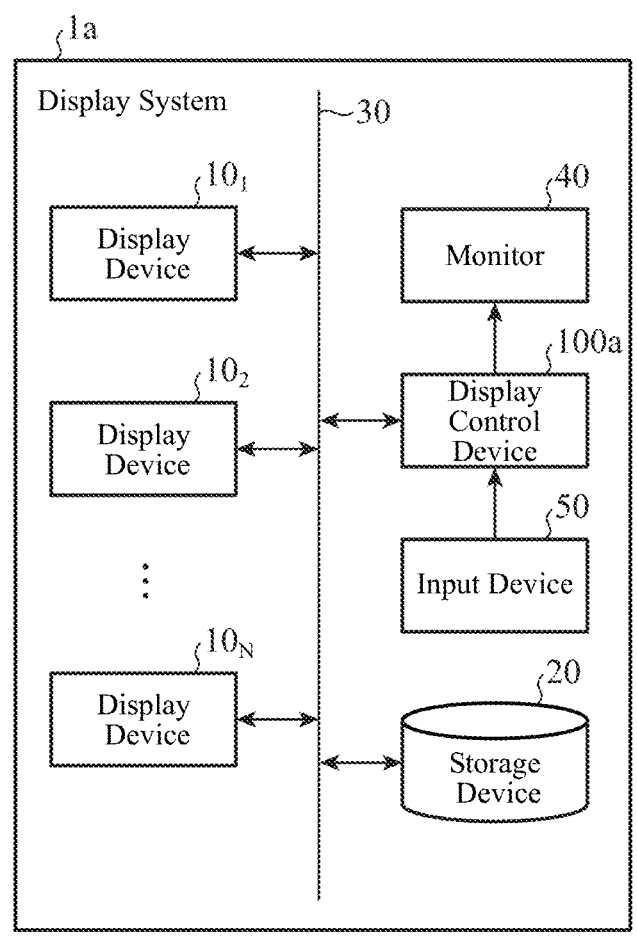
FIG. 8 is a block diagram illustrating an example of configuration of a main part of a display system to which a display control device according to a second embodiment is applied.

FIG. 8 is a block diagram illustrating an example of the configuration of the main part of the display system 1a to which display control device 100a according to the second embodiment is applied.

The display system 1a is obtained by changing the display control device 100 in the display system 1 according to the first embodiment to the display control device 100a.

That is, the display system 1a includes N display devices $10_1, 10_2, \ldots, 10_N$, a storage device 20, a network 30, the display control device 100a, a monitor 40, and an input device 50. The display system 1a may include a sensor (not illustrated) in addition to the above-described configuration. Furthermore, the display system 1a may include an imaging device (not illustrated) in addition to the above-described configuration.

Each of the N display devices $10_1, 10_2, \ldots, 10_N$, the storage device 20, the display control device 100a included in the display system 1a are connected via the network 30 capable of transmitting and receiving information.

In FIG. 8, the same reference numerals are given to the similar blocks as those illustrated in FIG. 1, and the description thereof will be omitted.

The display control device 100a generates a display image, and outputs display image information indicating the generated display image to the monitor 40.

The configuration of a main part of the display control device 100a according to the second embodiment will be described with reference to FIG. 9.

Figure 9:
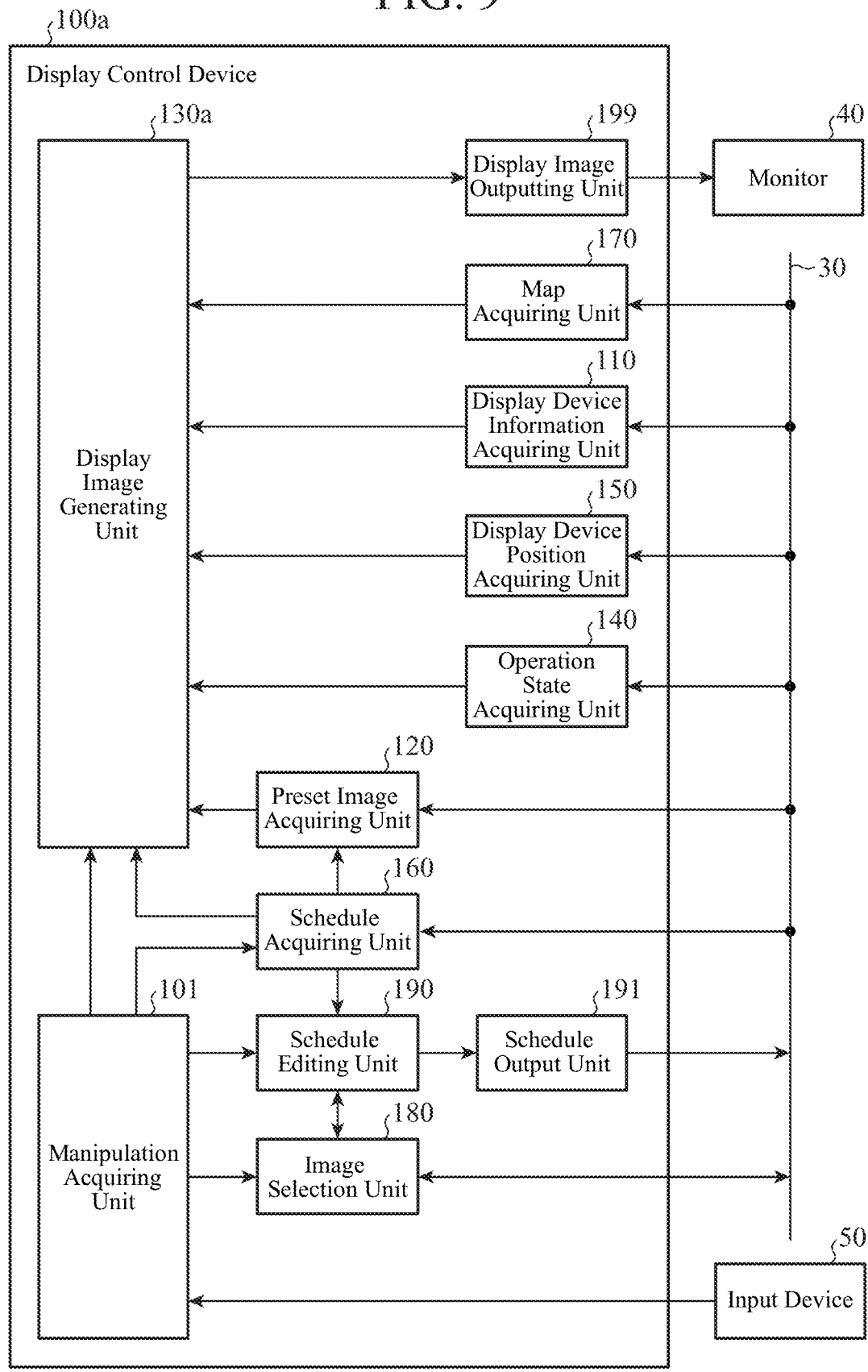
FIG. 9 is a block diagram illustrating an example of configuration of a main part of the display control device according to the second embodiment.

FIG. 9 is a block diagram illustrating an example of the configuration of the main part of the display control device 100a according to the second embodiment.

The display control device 100a includes a manipulation acquiring unit 101, a display device information acquiring unit 110, a preset image acquiring unit 120, a display image generating unit 130a, an operation state acquiring unit 140, a display device position acquiring unit 150, a schedule acquiring unit 160, an image selection unit 180, a schedule editing unit 190, a schedule output unit 191, and a display image outputting unit 199.

In addition to the above-described configuration, the display control device 100a may include an image acquiring unit, an image editing unit, and an image output unit (all not illustrated).

That is, the display control device 100a is obtained by changing the display image generating unit 130 included in the display control device 100 according to the first embodiment to the display image generating unit 130a.

In FIG. 9, the same reference numerals are given to the blocks similar to the blocks illustrated in FIG. 2, and the description thereof will be omitted.

The display image generating unit 130 according to the first embodiment decides a mode of each of a plurality of display device images to be generated on the basis of the manipulation information acquired by the manipulation acquiring unit 101, the position information acquired by the display device position acquiring unit 150, the schedule information acquired by the schedule acquiring unit 160, the preset image information acquired by the preset image acquiring unit 120, or the operation state information acquired by the operation state acquiring unit 140, generates each of the plurality of display device images on the basis of the decided mode, and generates a display image in which the plurality of display device images generated are disposed.

With such a configuration, in a case where the plurality of display devices $10_1, 10_2, \ldots, 10_N$ are arranged, the display control device 100 according to the first embodiment can display a display device image to be noted on the monitor 40 so as to be more conspicuous than other display device images while enabling display contents displayed on each of the plurality of display devices $10_1, 10_2, \ldots, 10_N$ to be compared simultaneously.

On the other hand, the display image generating unit 130a decides a mode of arranging the plurality of display device images generated by the display image generating unit 130a in a lattice pattern on the basis of the manipulation information acquired by the manipulation acquiring unit 101, the position information acquired by the display device position acquiring unit 150, the schedule information acquired by the schedule acquiring unit 160, the preset image information acquired by the preset image acquiring unit 120, or the operation state information acquired by the operation state acquiring unit 140, and generates a display image in which the plurality of display device images are disposed in a lattice pattern on the basis of the determined mode.

Specifically, when generating a display image in which a plurality of display device images generated by the display image generating unit 130a are arranged in a lattice pattern, the display image generating unit 130a decides a mode of arranging the plurality of display device images in a lattice pattern by rearranging the plurality of display device images generated by the display image generating unit 130a on the basis of the manipulation information, the position information, the schedule information, the preset image information, or the operation state information, and generates a display image in which the plurality of display device images are disposed in a lattice pattern on the basis of the decided mode.

Figure 10:
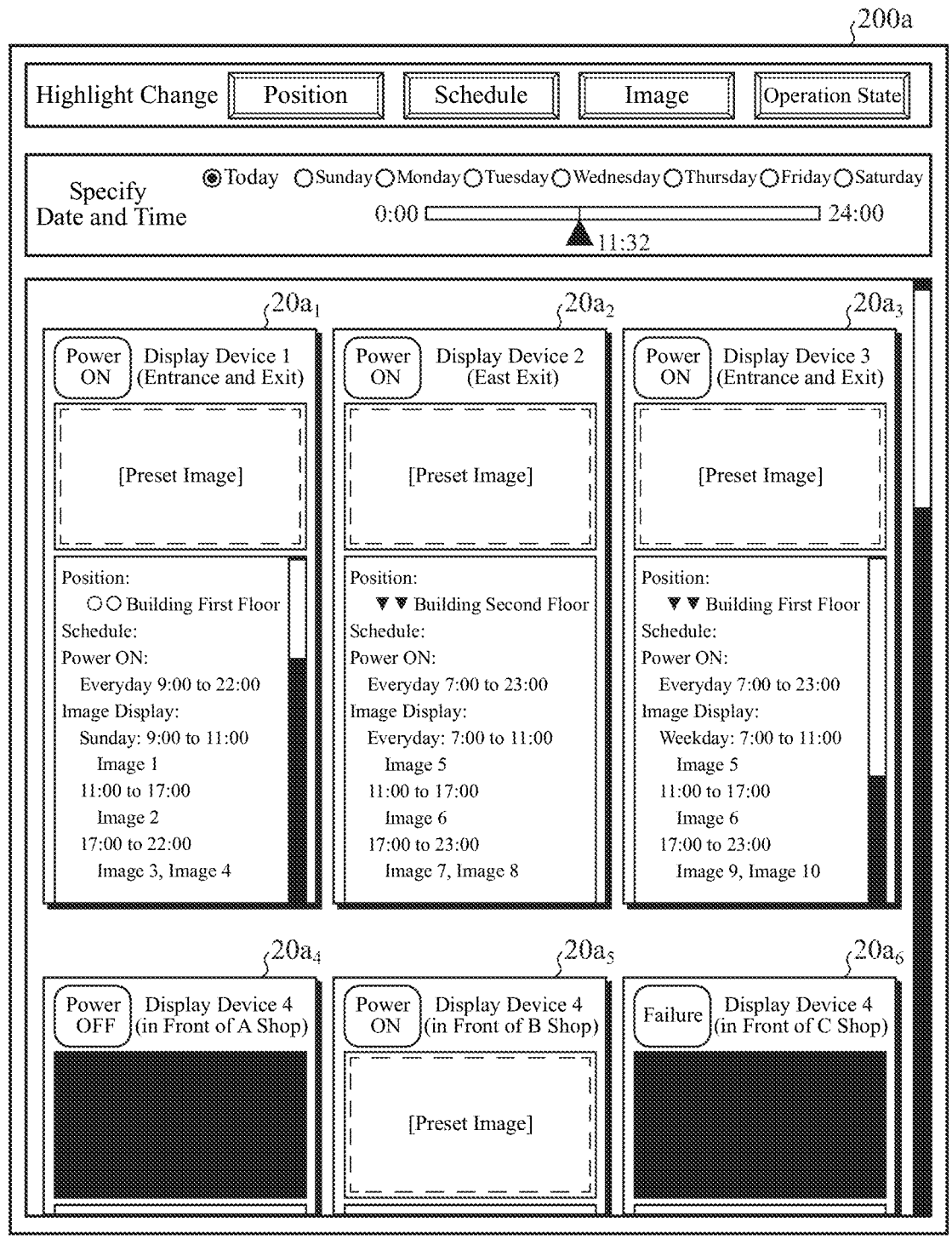
FIG. 10 is an explanatory diagram illustrating an example of a display image indicated by display image information output by the display control device according to the second embodiment.

FIG. 10 is an explanatory diagram illustrating an example of a display image 200a indicated by the display image information output by the display control device 100a according to the second embodiment.

The display images 200a illustrated in FIG. 10 include the display device images $20a_1, 20a_2, \ldots, 20a_N$ in which the display device information corresponding to each of the display devices $10_1, 10_2, \ldots, 10_N$ and the preset images indicated by the preset image information corresponding to each of the display devices $10_1, 10_2, \ldots, 10_N$ are associated with each other for each of the display devices $10_1, 10_2, \ldots, 10_N$.

More specifically, as an example, the display image $200a$ illustrated in FIG. 10 is obtained by aligning the display device images $20a_1, 20a_2, \ldots, 20a_N$ in a lattice pattern.

The display image generating unit $130a$ generates a display image $200a$ in which a plurality of display device images $20a_1, 20a_2, \ldots, 20a_N$ generated by the display image generating unit $130a$ are aligned in a lattice pattern.

When the display image $200a$ illustrated in FIG. 10 does not entirely fit in the display region of the monitor 40, the display control device $100a$ may display the entire display image $200a$ in the display area of the monitor 40 by enabling scroll display, for example, as illustrated in FIG. 10.

With this configuration, in a case where the plurality of display devices $10_1, 10_2, \ldots, 10_N$ are arranged, the display control device $100a$ can display the display device images $20a_1, 20a_2, \ldots,$ and $20a_N$ to be noted at conspicuous positions in the display region of the monitor 40 as compared with the other display device images $20a_1, 20a_2, \ldots, 20a_N$ while enabling the display contents displayed on the plurality of display devices $10_1, 10_2, \ldots, 10_N$ to be compared simultaneously.

Specifically, for example, the display image generating unit $130a$ decides a mode in which the display device images $20a_1, 20a_2, \ldots, 20a_N$ corresponding to the display devices $10_1, 10_2, \ldots, 10_N$ are arranged in a lattice pattern so as to be aligned from the upper left of the display image $200a$ illustrated in FIG. 10 in order from one in which the positions of the display devices $10_1, 10\ a_2, \ldots, 10_N$ indicated by the position information acquired by the display device position acquiring unit 150 are closer to the predetermined positions in the facility. The display image generating unit $130a$ generates a display image $200a$ in which a plurality of display device images $20a_1, 20a_2, \ldots, 20a_N$ are aligned in a lattice pattern on the basis of the decided mode.

The display image generating unit $130a$ may decide a position in the facility on the basis of the manipulation information acquired by the manipulation acquiring unit 101, and decide a mode in which the display device images $20a_1, 20a_2, \ldots, 20a_N$ corresponding to the display devices $10_1, 10_2, \ldots, 10_N$ are arranged in a lattice pattern so as to be aligned from the upper left of the display image $200a$ illustrated in FIG. 10 in order from one in which the positions of the display devices $10_1, 10_2, \ldots, 10_N$ indicated by the position information are closer to the positions decided on the basis of the manipulation information.

Note that the display image generating unit $130a$ is only required to decide a mode of aligning the plurality of display device images $20a_1, 20a_2, \ldots, 20a_N$ generated by the display image generating unit $130a$ in a lattice pattern on the basis of the position information, and the method of deciding the mode is not limited to the above.

For example, in a case where the display devices $10_1, 10_2, \ldots, 10_N$ are movable in the facility by self-propelling, the display image generating unit $130a$ may calculate the movement amount, the movement speed, or the like of the display devices $10_1, 10_2, \ldots, 10_N$ on the basis of the position information, and decide a mode in which the display device images $20a_1, 20a_2, \ldots,$ and $20a_N$ corresponding to the display devices $10_1, 10_2, \ldots, 10_N$ are aligned in a lattice pattern so as to be arranged from the upper left of the display image $200a$ illustrated in FIG. 10 in accordance with the order of the high movement amount or the high movement speed of the display devices $10_1, 10_2, \ldots, 10_N$, on the basis of the calculated movement amount or the movement speed, or the like.

Moreover, the display image generating unit $130a$ may decide a mode in which the display device images $20a_1, 20a_2, \ldots, 20a_N$ corresponding to the display devices $10_1, 10_2, \ldots, 10_N$ are arranged in a lattice pattern so as to be aligned from the upper left of the display image $200a$ illustrated in FIG. 10 in the order in which the time when the preset image displayed in accordance with the schedule indicated by the schedule information acquired by the schedule acquiring unit 160 is changed is closer to a predetermined time point such as the current time point. The display image generating unit $130a$ generates a display image $200a$ in which a plurality of display device images $20a_1, 20a_2, \ldots, 20a_N$ are aligned in a lattice pattern on the basis of the decided mode.

Furthermore, the display image generating unit $130a$ may decide a time which is a reference point (hereinafter referred to as "reference time point") on the basis of the manipulation information acquired by the manipulation acquiring unit 101, and decide a mode in which the display device images $20a_1, 20a_2, \ldots, 20a_N$ corresponding to the display devices $10_1, 10_2, \ldots, 10_N$ are aligned in a lattice pattern so as to be aligned from the upper left of the display image $200a$ illustrated in FIG. 10 in the order from the time when the preset image displayed in accordance with the schedule is changed is close to the reference time point decided on the basis of the manipulation information.

Note that the display image generating unit $130a$ only needs to decide a mode of aligning the plurality of display device images $20a_1, 20a_2, \ldots, 20a_N$ generated by the display image generating unit $130a$ in a lattice pattern on the basis of the schedule information, and the method of deciding the mode is not limited to the above.

For example, the display image generating unit $130a$ may decide a mode in which the display device images $20a_1, 20a_2, \ldots, 20a_N$ corresponding to the display devices $10_1, 10_2, \ldots, 10_N$ are aligned in a lattice pattern so as to be aligned from the upper left of the display image $200a$ illustrated in FIG. 10 in accordance with the order of complexity of the schedule indicated by the schedule information, the descending order of the number of preset images displayed in accordance with the schedule indicated by the schedule information, or the like.

Furthermore, for example, the display image generating unit $130a$ may decide a mode in which the display device images $20a_1, 20a_2, \ldots, 20a_N$ corresponding to the display devices $10_1, 10_2, \ldots, 10_N$ are aligned in a lattice pattern so as to be aligned from the upper left of the display image $200a$ illustrated in FIG. 10 in accordance with the order of the newest update date and time of the schedule information.

Moreover, the display image generating unit $130a$ may decide a mode in which the display device images $20a_1, 20a_2, \ldots, 20a_N$ corresponding to the display devices $10_1, 10_2, \ldots, 10_N$ are aligned in a lattice pattern so as to be aligned from the upper left of the display image $200a$ illustrated in FIG. 10 in the order in which the creation date and time, the update date and time, or the like of the plurality of pieces of preset image information acquired by the preset image acquiring unit 120 are closer to the current time point. The display image generating unit $130a$ generates a display image $200a$ in which a plurality of display device images $20a_1, 20a_2, \ldots, 20a_N$ are aligned in a lattice pattern on the basis of the decided mode.

Note that the display image generating unit 130a only needs to decide a mode of aligning the plurality of display device images $20a_1, 20a_2, \ldots, 20a_N$ generated by the display image generating unit 130a in a lattice pattern on the basis of the preset image information, and the method of deciding the mode is not limited to the above-described method.

For example, the display image generating unit 130a may decide a mode in which the display device images $20a_1, 20a_2, \ldots, 20a_N$ corresponding to the display devices $10_1, 10_2, \ldots, 10_N$ are arranged in a lattice pattern so as to be aligned from the upper left of the display image 200a illustrated in FIG. 10 in descending order of the number of preset images indicated by the preset image information or the number of preset images in which some of the preset images are the same.

In addition, the display image generating unit 130a may decide a mode in which the display device images $20a_1, 20a_2, \ldots, 20a_N$ corresponding to the display devices $10_1, 10_2, \ldots, 10_N$ corresponding to the operation state information indicating the failure of the display devices $10_1, 10_2, \ldots, 10_N$ among the plurality of pieces of operation state information acquired by the operation state acquiring unit 140 are aligned in a lattice pattern so as to be aligned from the upper left of the display image 200a illustrated in FIG. 10. The display image generating unit 130a generates a display image 200a in which a plurality of display device images $20a_1, 20a_2, \ldots, 20a_N$ are aligned in a lattice pattern on the basis of the decided mode.

Note that the display image generating unit 130a only needs to decide a mode of each of the plurality of display device images $20a_1, 20a_2, \ldots, 20a_N$ in which the plurality of the display device images $20a_1, 20a_2, \ldots, 20a_N$ are generated by the display image generating unit 130a on the basis of the operation state information, and the method for deciding the mode is not limited to the above.

For example, the display image generating unit 130a may decide a mode in which the display device images $20a_1, 20a_2, \ldots, 20a_N$ corresponding to the display devices $10_1, 10_2, \ldots, 10_N$ corresponding to the operation state information indicating that the display devices $10_1, 10_2, \ldots, 10_N$ are in the ON state among the plurality of pieces of operation state information acquired by the operation state acquiring unit 140 are aligned in a lattice pattern so as to be aligned from the upper left of the display image 200a illustrated in FIG. 10.

Furthermore, for example, the display image generating unit 130a may decide a mode in which the display device images $20a_1, 20a_2, \ldots, 20a_N$ corresponding to the display devices $10_1, 10_2, \ldots, 10_N$ are aligned in a lattice pattern so as to be aligned from the upper left of the display image 200a illustrated in FIG. 10 in accordance with the order in which the display states of the preset images on the display devices $10_1, 10_2, \ldots, 10_N$ indicated by the operation state information are not good.

Furthermore, for example, the display image generating unit 130a may decide a mode in which the display device images $20a_1, 20a_2, \ldots, 20a_N$ corresponding to the display devices $10_1, 10_2, \ldots, 10_N$ indicated by the operation state information are aligned in a lattice pattern so as to be aligned from the upper left of the display image 200a illustrated in FIG. 10 in accordance with the order of the installation date and time of the display devices $10_1, 10_2, \ldots, 10_N$ from the latest.

In addition, the display image generating unit 130a may decide a mode of aligning the plurality of display device images $20a_1, 20a_2, \ldots, 20a_N$ generated by the display image generating unit 130a in a lattice pattern on the basis of the manipulation information acquired by the manipulation acquiring unit 101. The display image generating unit 130a generates a display image 200a in which a plurality of display device images $20a_1, 20a_2, \ldots, 20a_N$ are aligned in a lattice pattern on the basis of the decided mode.

Specifically, for example, a user selects any of a plurality of buttons for changing the alignment order provided to change the mode illustrated in FIG. 10. The buttons for changing the alignment order are, for example, a position button for deciding a mode of alignment in a lattice pattern on the basis of position information indicating the positions of the display devices $10_1, 10_2, \ldots, 10_N$, a schedule button for deciding a mode of alignment in a lattice pattern on the basis of schedule information indicating the schedules of the display devices $10_1, 10_2, \ldots, 10_N$, a preset image button for deciding a mode of alignment in a lattice pattern on the basis of the preset image information indicating the preset images displayed by the display devices $10_1, 10_2, \ldots, 10_N$, or an operation state button for deciding a mode of alignment in a lattice pattern on the basis of operation state information indicating the operation states of the display devices $10_1, 10_2, \ldots, 10_N$.

The display image generating unit 130a decides a mode of aligning the plurality of display device images $20a_1, 20a_2, \ldots, 20a_N$ generated by the display image generating unit 130a in a lattice pattern on the basis of manipulation information indicating manipulation of selecting any of the plurality of buttons for changing alignment order. The display image generating unit 130a generates a display image 200a in which a plurality of display device images $20a_1, 20a_2, \ldots, 20a_N$ are aligned in a lattice pattern on the basis of the decided mode.

Note that each of the functions of the manipulation acquiring unit 101, the display device information acquiring unit 110, the preset image acquiring unit 120, the display image generating unit 130a, the operation state acquiring unit 140, the display device position acquiring unit 150, the schedule acquiring unit 160, the image selection unit 180, the schedule editing unit 190, the schedule output unit 191, and the display image outputting unit 199 included in the display control device 100a according to the second embodiment may be implemented by the processor 601 and the memory 602 in the hardware configuration illustrated as an example in FIGS. 6A and 6B in the first embodiment, or may be implemented by the processing circuit 603.

The operation of the display control device 100a according to the second embodiment will be described with reference to FIGS. 11A and 11B.

Figure 11B:
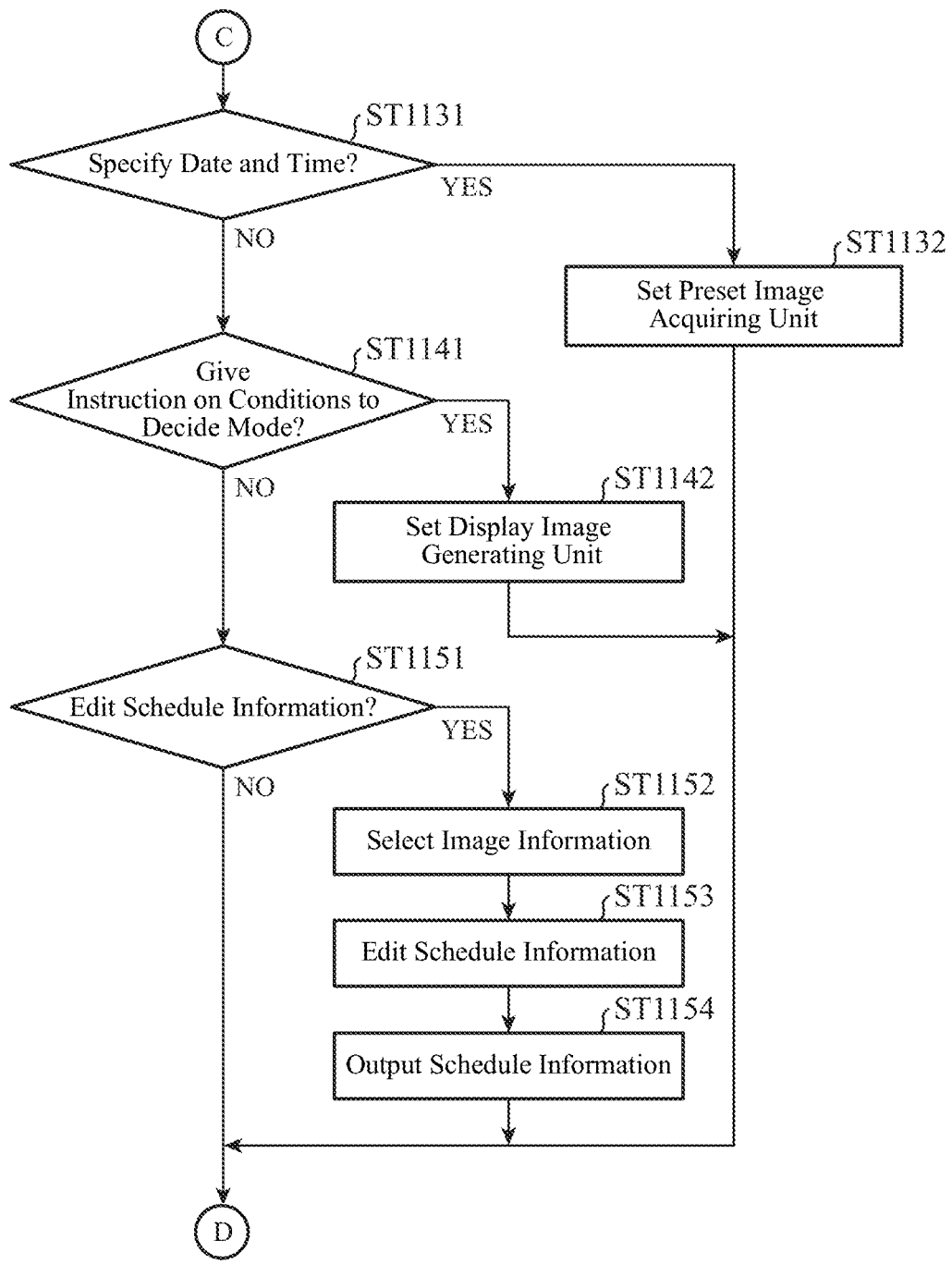
FIG. 11B is the remaining part of the flowchart illustrating an example of processing of the display control device according to the second embodiment.

FIG. 11A is a part of a flowchart illustrating an example of processing of the display control device 100a according to the second embodiment, and FIG. 11B is the remainder of the flowchart illustrating the example of processing of the display control device 100a according to the second embodiment. Hereinafter, FIGS. 11A and 11B will be collectively referred to as FIG. 11.

First, in step ST1101, the display device information acquiring unit 110 acquires the display device information.

Next, in step ST1102, the preset image acquiring unit 120 acquires the preset image information.

Next, in step ST1103, the operation state acquiring unit 140 acquires the operation state information.

Next, in step ST1104, the display device position acquiring unit 150 acquires the position information.

Next, in step ST1105, the schedule acquiring unit 160 acquires the schedule information.

Next, in step ST1111, the display image generating unit 130*a* generates the display device images 20*a*$_1$, 20*a*$_2$, ..., 20*a*$_N$.

Next, in step ST1112, the display image generating unit 130*a* generates the display image 200*a*.

Next, in step ST1113, the display image outputting unit 199 outputs the display image information.

Next, in step ST1121, the manipulation acquiring unit 101 determines whether or not the manipulation information has been acquired.

In a case where it is determined in step ST1121 that the manipulation acquiring unit 101 has not acquired the operation information, the display control device 100*a* returns to step ST1101 and repeatedly executes the processing of the flowchart illustrated in FIG. 11.

In a case where it is determined in step ST1121 that the manipulation acquiring unit 101 has acquired the operation information, in step ST1122, the manipulation acquiring unit 101 determines whether or not the user manipulation indicated by the acquired manipulation information is an instruction to end the processing of the display control device 100*a*.

In step ST1122, in a case where the manipulation acquiring unit 101 determines that the user manipulation is an instruction to end the processing of the display control device 100*a*, the display control device 100*a* ends the processing of the flowchart illustrated in FIG. 11.

In step ST1122, in a case where the manipulation acquiring unit 101 determines that the user manipulation is not an instruction to end the processing of the display control device 100*a*, in step ST1131, the preset image acquiring unit 120 determines whether or not the user manipulation indicated by the manipulation information specifies date and time.

In step ST1131, in a case where the preset image acquiring unit 120 determines that the user manipulation specifies a date and time, in step ST1132, the preset image acquiring unit 120 sets the preset image acquiring unit 120 to acquire the preset image information corresponding to the date and time when the preset image acquiring unit 120 acquires the preset image information the next time or later. After step ST1132, the display control device 100*a* returns to step ST1101 and repeatedly executes the processing of the flowchart illustrated in FIG. 11.

In step ST1131, in a case where the preset image acquiring unit 120 determines that the user manipulation does not specify the date and time, in step ST1141, the display image generating unit 130*a* determines whether or not the user manipulation indicated by the manipulation information gives an instruction on a condition for deciding a mode for aligning the plurality of display device images 20*a*$_1$, 20*a*$_2$, ..., 20*a*$_N$ generated by the display image generating unit 130*a* in a lattice pattern.

In a case where the display image generating unit 130*a* determines in step ST1141 that the user manipulation gives an instruction on a condition for deciding a mode of aligning the plurality of display device images 20*a*$_1$, 20*a*$_2$, ..., 20*a*$_N$ in a lattice pattern, in step ST1142, when the display image generating unit 130*a* generates the display image 200*a* in which the plurality of display device images 20*a*$_1$, 20*a*$_2$, ..., 20*a*$_N$ generated by the display image generating unit 130*a* are aligned in a lattice pattern next time or later, the display image generating unit 130*a* decides a mode of aligning the plurality of display device images 20*a*$_1$, 20*a*$_2$, ..., 20*a*$_N$ in a lattice pattern in accordance with the condition, and the display image generating unit 130*a* is set so as to generate the display image 200*a* in which a plurality of display device images 20*a*$_1$, 20*a*$_2$, ..., 20*a*$_N$ are disposed in a lattice pattern on the basis of the decided mode. After step ST1142, the display control device 100*a* returns to step ST1101 and repeatedly executes the processing of the flowchart illustrated in FIG. 11.

In step ST1141, in a case where the display image generating unit 130*a* determines that the user manipulation does not give an instruction on the condition for deciding the mode of aligning the plurality of display device images 20*a*$_1$, 20*a*$_2$, ..., 20*a*$_N$ in a lattice pattern, in step ST1151, the schedule editing unit 190 determines whether or not the user manipulation indicated by the manipulation information is for editing the schedule information.

In step ST1151, in a case where the schedule editing unit 190 determines that the user manipulation is for editing the schedule information, the image selection unit 180 selects the image information in step ST1152.

After step ST1152, in step ST1153, the schedule editing unit 190 edits the schedule information.

After step ST1153, in step ST1154, the schedule output unit 191 outputs the schedule information.

After step ST1154, the display control device 100*a* returns to step ST1101 and repeatedly executes the processing of the flowchart illustrated in FIG. 11.

In step ST1151, in a case where the schedule editing unit 190 determines that the user manipulation is not for editing the schedule information, the display control device 100*a* discards the manipulation information, returns to step ST1101, and repeatedly executes the processing of the flowchart illustrated in FIG. 11.

Note that the processing from step ST1101 to step ST1105 only needs to be executed before the processing of step ST1111 is executed, and the order of the processing is arbitrary. In addition, the processing of step ST1101 only needs to be executed only once, and the second and subsequent steps can be omitted.

As described above, the display control device 100*a* according to the second embodiment includes: the display device information acquiring unit 110 that acquires the display device information indicating each of the plurality of display devices 10$_1$, 10$_2$, ..., 10$_N$ that is disposed in the facility and displays the preset image; the preset image acquiring unit 120 that acquires the preset image information indicating the preset image displayed by each of the plurality of display devices 10$_1$, 10$_2$, ..., 10$_N$, and the display image generating unit 130*a* that generates the display image 200*a* and generates, for each of the display devices 10$_1$, 10$_2$, ..., 10$_N$, the display device images 20*a*$_1$, 20*a*$_2$, ..., 20*a*$_N$ in which the display device information acquired by the display device information acquiring unit 110 is associated with the preset image indicated by the preset image information acquired by the preset image acquiring unit 120, the display image generating unit 130*a* that generates the display image 200*a* in which the plurality of generated display device images 20*a*$_1$, 20*a*$_2$, ..., 20*a*$_N$ are aligned; and the display image outputting unit 199 that outputs the display image 200*a* generated by the display image generating unit 130*a* as the display image information, and the display image generating unit 130*a* is configured to generate the display image 200*a* in which the plurality of display device images 20*a*$_1$, 20*a*$_2$, ..., 20*a*$_N$ generated by the display image generating unit 130*a* are aligned in a lattice pattern.

With this configuration, in a case where the plurality of display devices 10$_1$, 10$_2$, ..., 10$_N$ are arranged, the display control device 100*a* enables display contents displayed on the plurality of display devices $10_1, 10_2, \ldots, 10_N$ to be compared simultaneously.

Furthermore, in addition to the configuration described above, the display control device 100*a* according to the second embodiment includes the manipulation acquiring unit 101 that acquires the manipulation information indicating the user manipulation, and the display image generating unit 130*a* is configured to decide a mode of aligning the plurality of display device images $20a_1, 20a_2, \ldots, 20a_N$ generated by the display image generating unit 130*a* in a lattice pattern on the basis of the manipulation information acquired by the manipulation acquiring unit 101, and generate the display image 200*a* in which the plurality of display device images $20a_1, 20a_2, \ldots, 20a_N$ are aligned in a lattice pattern on the basis of the decided mode.

With this configuration, in a case where the plurality of display devices $10_1, 10_2, \ldots, 10_N$ are arranged, the display control device 100*a* can display the display device images $20a_1, 20a_2, \ldots,$ and $20a_N$ to be noted at conspicuous positions in the display region of the monitor 40 as compared with the other display device images $20a_1, 20a_2, \ldots, 20a_N$ while enabling the display contents displayed on the plurality of display devices $10_1, 10_2, \ldots, 10_N$ to be compared simultaneously.

Moreover, in addition to the above-described configuration, the display control device 100*a* according to the second embodiment includes the display device position acquiring unit 150 that acquires position information indicating a position where each of the plurality of display devices $10_1, 10_2, \ldots, 10_N$ is arranged, and the display image generating unit 130*a* is configured to decide a mode of aligning the plurality of display device images $20a_1, 20a_2, \ldots, 20a_N$ generated by the display image generating unit 130*a* in a lattice pattern on the basis of the position information acquired by the display device position acquiring unit 150, and generate the display image 200*a* in which the plurality of display device images $20a_1, 20a_2, \ldots, 20a_N$ are aligned in a lattice pattern on the basis of the decided mode.

With this configuration, in a case where the plurality of display devices $10_1, 10_2, \ldots, 10_N$ are arranged, the display control device 100*a* can display the display device images $20a_1, 20a_2, \ldots,$ and $20a_N$ to be noted at conspicuous positions in the display region of the monitor 40 as compared with the other display device images $20a_1, 20a_2, \ldots, 20a_N$ while enabling the display contents displayed on the plurality of display devices $10_1, 10_2, \ldots, 10_N$ to be compared simultaneously.

Moreover, in addition to the above-described configuration, the display control device 100*a* according to the second embodiment includes the schedule acquiring unit 160 that acquires the schedule information indicating the schedule in which each of the plurality of display devices $10_1, 10_2, \ldots, 10_N$ displays a preset image, and the display image generating unit 130*a* is configured to decide a mode of aligning the plurality of display device images $20a_1, 20a_2, \ldots, 20a_N$ generated by the display image generating unit 130*a* in a lattice pattern on the basis of the schedule information acquired by the schedule acquiring unit 160, and generate the display image 200*a* in which the plurality of display device images $20a_1, 20a_2, \ldots, 20a_N$ are disposed in a lattice pattern on the basis of the decided mode.

With this configuration, in a case where the plurality of display devices $10_1, 10_2, \ldots, 10_N$ are arranged, the display control device 100*a* can display the display device images $20a_1, 20a_2, \ldots,$ and $20a_N$ to be noted at conspicuous positions in the display region of the monitor 40 as compared with the other display device images $20a_1, 20a_2, \ldots, 20a_N$ while enabling the display contents displayed on the plurality of display devices $10_1, 10_2, \ldots, 10_N$ to be compared simultaneously.

Moreover, in the display control device 100*a* according to the second embodiment, in the above-described configuration, the display image generating unit 130*a* is configured to decide a mode of aligning the plurality of display device images $20a_1, 20a_2, \ldots, 20a_N$ generated by the display image generating unit 130*a* in a lattice pattern on the basis of the preset image information acquired by the preset image acquiring unit 120, and generate the display image 200*a* in which the plurality of display device images $20a_1, 20a_2, \ldots,$ and $20a_N$ are disposed in a lattice pattern on the basis of the decided mode.

With this configuration, in a case where the plurality of display devices $10_1, 10_2, \ldots, 10_N$ are arranged, the display control device 100*a* can display the display device images $20a_1, 20a_2, \ldots,$ and $20a_N$ to be noted at conspicuous positions in the display region of the monitor 40 as compared with the other display device images $20a_1, 20a_2, \ldots, 20a_N$ while enabling the display contents displayed on the plurality of display devices $10_1, 10_2, \ldots, 10_N$ to be compared simultaneously.

Furthermore, in addition to the above-described configuration, the display control device 100*a* according to the second embodiment includes the operation state acquiring unit 140 that acquires the operation state information on the display devices $10_1, 10_2, \ldots, 10_N$, and the display image generating unit 130*a* is configured to decide a mode of aligning the plurality of display device images $20a_1, 20a_2, \ldots,$ and $20a_N$ generated by the display image generating unit 130*a* in a lattice pattern on the basis of the operation state information acquired by the operation state acquiring unit 140, and generate the display image 200*a* in which the plurality of display device images $20a_1, 20a_2, \ldots, 20a_N$ is disposed in a lattice pattern on the basis of the decided mode.

With this configuration, in a case where the plurality of display devices $10_1, 10_2, \ldots, 10_N$ are arranged, the display control device 100*a* can display the display device images $20a_1, 20a_2,$ and $20a_N$ to be noted at conspicuous positions in the display region of the monitor 40 as compared with the other display device images $20a_1, 20a_2, 20a_N$ while enabling the display contents displayed on the plurality of display devices $10_1, 10_2, \ldots, 10_N$ to be compared simultaneously.

Note that, in the scope of the present invention, the present disclosure allows free combinations of each embodiment, modification of any constituents of each embodiment, or omission of any constituents in each embodiment.

INDUSTRIAL APPLICABILITY

The display control device of the present disclosure can be applied to a display system including a plurality of display devices arranged in a facility and displaying a preset image.

REFERENCE SIGNS LIST

1, 1*a*: display system, $10_1, 10_2, \ldots, 10_N$: display device, 20: storage device, 30: network, 40: monitor, 50: input device, 100, 100*a*: display control device, 101: manipulation acquiring unit, 110: display device information acquiring unit, 120: preset image acquiring unit, 130, 130*a*: display image generating unit, 140: operation state acquiring unit, 150: display device position acquiring unit, 160: schedule acquiring unit, 170: map acquiring unit, 180: image selection unit, 190: schedule editing unit, 191: schedule output unit, 199: display image outputting unit, 200, 200a: display image, 20₁, 20₂, . . . , 20_N, 20a₁, 20a₂, . . . , 20a_N: display device image, 210: pop-up image, 601: processor, 602: memory, 603: processing circuit

The invention claimed is:

1. A display control device comprising:
processing circuitry to perform a process to:
acquire display device information indicating each of a plurality of display devices which displays a preset image using devices being disposed in a facility;
acquire preset image information indicating the preset image displayed by each of the plurality of the display devices;
acquire operation state information indicating an operation state of each of the plurality of the display devices;
acquire position information indicating a position where each of the plurality of the display devices is arranged;
generate a display image, wherein the process generates, for each of the display devices, a display device image, each display device image includes the display device information, the preset image indicated by the preset image information, the operation state information, and the position information associated with each other, the display image being generated so that a plurality of the display device images are aligned with each other and disposed in a lattice pattern; and
output to a monitor the display image as display image information.

2. The display control device according to claim 1, the process further comprising:
to acquire schedule information indicating a schedule in which each of the plurality of the display devices displays the preset image,
wherein the process generates, for each of the display devices, the display device image in which the schedule information is associated in addition to the display device information, the preset image indicated by the preset image information, the operation state information, and the position information.

3. The display control device according to claim 2, wherein the schedule information indicates a time period during which power is turned on for the corresponding display device.

4. The display control device according to claim 2, wherein the schedule information includes a plurality of time periods for displaying each of a plurality of different preset images on the corresponding display device.

5. The display control device according to claim 1, the process further comprising:
to acquire schedule information indicating a schedule in which each of the plurality of the display devices displays the preset image; and
to acquire operation information indicating user manipulation, wherein the process decides the preset image information to be acquired on a basis of the operation information and the schedule information indicated.

6. The display control device according to claim 1, the process further comprising:
to acquire manipulation information indicating user manipulation,
wherein the process decides a mode of each of the plurality of the display device images to be generated based on the manipulation information, and generates each of the plurality of the display device images based on the mode.

7. The display control device according to claim 1,
wherein the process decides a mode of each of the plurality of the display device images to be generated based on the position information, and generates each of the plurality of the display device images based on the mode.

8. The display control device according to claim 1, the process further comprising:
to acquire schedule information indicating a schedule in which each of the plurality of the display devices displays the preset image,
wherein the process decides a mode of each of the plurality of the display device images to be generated based on the schedule information, and generates each of the plurality of the display device images based on the mode.

9. The display control device according to claim 1, wherein the process decides a mode of each of the plurality of the display device images to be generated based on the preset image information, and generates each of the plurality of the display device images based on the mode.

10. The display control device according to claim 1, wherein the process decides a mode of each of the plurality of display device images to be generated based on the operation state information, and generates each of the plurality of the display device images based on the mode.

11. The display control device according to claim 1, the process further comprising:
to acquire a map image indicating a map of the facility as map information; and
wherein the process generates the display image in which each of the plurality of the display device images is arranged and aligned in association with the position where each of the plurality of the display devices is arranged and indicated by the position information, on the map image indicated by the map information.

12. The display control device according to claim 1, the process further comprising:
to acquire manipulation information indicating user manipulation,
wherein the process decides a mode of aligning, in the lattice pattern, the plurality of the display device images based on the manipulation information, and generates the display image in which the plurality of the display device images are aligned in the lattice pattern based on the mode.

13. The display control device according to claim 1,
wherein the process decides a mode of aligning, in the lattice pattern, the plurality of the display device images based on the acquired position information, and generates the display image in which the plurality of the display device images are aligned in the lattice pattern based on the mode.

14. The display control device according to claim 1, the process further comprising:
to acquire schedule information indicating a schedule in which each of the plurality of the display devices displays the preset image,
wherein the process decides a mode of aligning, in the lattice pattern, the plurality of the display device images based on the schedule information, and generates the display image in which the plurality of the display device images are aligned in the lattice pattern based on the mode.

15. The display control device according to claim 1, wherein the process decides a mode of aligning, in the lattice pattern, the plurality of the display device images based on the preset image information, and generates the display image in which the plurality of the display device images are aligned in the lattice pattern based on the mode.

16. The display control device according to claim 1, wherein the process decides a mode of aligning, in the lattice pattern, the plurality of the display device images based on the operation state information, and generates the display image in which the plurality of the display device images are aligned in the lattice pattern based on the mode.

17. The display control device according to claim 1, the process further comprising:
   to acquire manipulation information indicating user manipulation;
   to select one or more of the plurality of the display devices from among the plurality of the display devices based on the manipulation information, and acquire schedule information indicating a schedule in which each of the one or more selected display devices displays the preset image;
   to edit the schedule information based on the manipulation information; and
   to output the edited schedule information.

18. The display control device according to claim 17, the process further comprising:
   to select image information indicating an image based on the manipulation information acquired,
   wherein the process edits the schedule information based on the manipulation information so that the image indicated by the image information is displayed on one or more of the display devices corresponding to the schedule information.

19. A display control method comprising:
   acquiring display device information indicating each of a plurality of display devices, which is disposed in a facility and displays a preset image;
   acquiring preset image information indicating the preset image displayed by each of the plurality of the display devices;
   acquiring operation state information indicating an operation state of each of the plurality of the display devices;
   acquiring position information indicating a position where each of the plurality of the display devices is arranged;
   generating a display image, wherein the method generates, for each of the display devices, a display device image, each display device image includes the display device information, the preset image indicated by the preset image information, the operation state information, and the position information associated with each other, the display image being generated so that a plurality of the display device images are aligned with each other and disposed in a lattice pattern; and
   outputting to a monitor the display image as display image information.

* * * * *